(12) United States Patent
Melrose

(10) Patent No.: US 10,273,072 B2
(45) Date of Patent: *Apr. 30, 2019

(54) CONTAINER STRUCTURE FOR REMOVAL OF VACUUM PRESSURE

(71) Applicant: CO2 PAC LIMITED, Auckland (NZ)

(72) Inventor: David Murray Melrose, Auckland (NZ)

(73) Assignee: CO2 PAC Limited, Auckland (NZ)

( * ) Notice: Subject to any disclaimer, the term of this patent is extended or adjusted under 35 U.S.C. 154(b) by 133 days.

This patent is subject to a terminal disclaimer.

(21) Appl. No.: 14/968,781

(22) Filed: Dec. 14, 2015

(65) Prior Publication Data
US 2016/0332794 A1    Nov. 17, 2016

Related U.S. Application Data

(63) Continuation of application No. 14/187,227, filed on Feb. 22, 2014, and a continuation of application No.
(Continued)

(30) Foreign Application Priority Data

Sep. 30, 2002 (NZ) ........................................ 521694

(51) Int. Cl.
B65D 79/00 (2006.01)
B65D 1/02 (2006.01)
(Continued)

(52) U.S. Cl.
CPC .............. B65D 79/005 (2013.01); B65B 3/04 (2013.01); B65D 1/0261 (2013.01);
(Continued)

(58) Field of Classification Search
CPC .. B65D 79/005; B65D 1/0261; B65D 1/0271; B65D 1/0276; B65B 3/022
(Continued)

(56) References Cited

U.S. PATENT DOCUMENTS 1,499,239 A    6/1924   Malmquist
D110,624 S     7/1938   Mekeel, Jr.
(Continued)

FOREIGN PATENT DOCUMENTS

AU    2002257159    4/2003
CA       2077717    3/1993
(Continued)

OTHER PUBLICATIONS

ISR for PCT/US 2004/024581 dated Jul. 25, 2005.
(Continued)

*Primary Examiner* — Sue A Weaver
(74) *Attorney, Agent, or Firm* — Henricks Slavin LLP

(57) ABSTRACT

A hot-fill PET container or bottle (10) filling with a liquid at an elevated temperature has a side wall (9) extending to a lower portion including a pressure panel (11) and a base (21) in its unfolded or pre-fill position. The panel (11) is transversely oriented and has a decoupling or hinge structure or element (13), an initiator portion (1) and control portion (5) of a steeply angled inverting conical section between 30 and 45 degrees. The control portion enables the inversion of the panel (11) into the container (10) to compensate for vacuum or reduced pressure induced within the container as the liquid cools down. The base (2) can also have a plurality of reinforcing ribs (3).

15 Claims, 21 Drawing Sheets

Related U.S. Application Data

14/187,217, filed on Feb. 21, 2014, now Pat. No. 9,624,018, and a continuation of application No. 13/442,846, filed on Apr. 9, 2012, now Pat. No. 9,211,968, said application No. 14/187,217 is a continuation of application No. 13/442,846, filed on Apr. 9, 2012, now Pat. No. 9,211,968, said application No. 14/187,227 is a continuation of application No. 13/442,846, filed on Apr. 9, 2012, now Pat. No. 9,211,968, which is a continuation of application No. 10/529,198, filed as application No. PCT/NZ03/00220 on Sep. 30, 2003, now Pat. No. 8,152,010.

(51) Int. Cl.
   *B65B 3/04*      (2006.01)
   *B65B 61/24*     (2006.01)
   *B67C 3/22*      (2006.01)

(52) U.S. Cl.
   CPC ........... *B65D 1/0276* (2013.01); *B65D 79/00* (2013.01); *B65B 61/24* (2013.01); *B67C 2003/226* (2013.01)

(58) Field of Classification Search
   USPC .......................................... 215/373; 220/609
   See application file for complete search history.

(56) References Cited

U.S. PATENT DOCUMENTS

| | | |
|---|---|---|
| 2,124,959 A | 7/1938 | Vogel |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski et al. |
| 3,174,655 A | 3/1965 | Hurschman |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,426,939 A | 2/1969 | Young |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,883,033 A | 5/1975 | Brown |
| 3,904,069 A | 9/1975 | Toukmanian |
| 3,918,920 A | 11/1975 | Barber |
| 3,935,955 A | 2/1976 | Das |
| 3,941,237 A | 3/1976 | Macgregor, Jr. |
| 3,942,673 A | 3/1976 | Lyu et al. |
| 3,949,033 A | 4/1976 | Uhlig |
| 3,956,441 A | 5/1976 | Uhlig |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,170,622 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,321,483 A | 3/1982 | Dugan |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla |
| 4,381,061 A | 4/1983 | Cerny et al. |
| D269,158 S | 5/1983 | Gaunt et al. |
| 4,386,701 A | 6/1983 | Galer et al. |
| 4,412,866 A | 11/1983 | Schoenrock et al. |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,855 A | 2/1985 | Agrawal et al. |
| 4,542,029 A | 9/1985 | Caner et al. |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,749,092 A | 6/1988 | Sugiura et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Bettle |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,967,538 A | 11/1990 | Leftault, Jr. et al. |
| 4,976,538 A | 12/1990 | Ake |
| 4,978,015 A | 12/1990 | Walker |
| 4,997,692 A | 3/1991 | Yoshino |
| 5,004,109 A | 4/1991 | Bartley |
| 5,005,716 A | 4/1991 | Eberle |
| 5,014,868 A | 5/1991 | Wittig et al. |
| 5,024,340 A | 6/1991 | Alberghini et al. |
| 5,033,254 A | 7/1991 | Zenger |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood et al. |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,333,761 A | 8/1994 | Davis et al. |
| 5,341,946 A | 8/1994 | Valliencourt et al. |
| 5,392,937 A | 2/1995 | Prevot et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,593,063 A | 1/1997 | Claydon et al. |
| 5,598,941 A | 2/1997 | Semersky et al. |

(56) References Cited

U.S. PATENT DOCUMENTS

| | | |
|---|---|---|
| 5,632,397 A | 5/1997 | Fandeux et al. |
| 5,642,826 A | 7/1997 | Melrose |
| 5,672,730 A | 9/1997 | Cottman |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppman, Sr. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko |
| 5,829,614 A | 11/1998 | Collette et al. |
| 5,858,300 A | 1/1999 | Shimizu et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,976,653 A | 11/1999 | Collette et al. |
| RE36,639 E | 4/2000 | Okhai |
| 6,065,624 A | 5/2000 | Steinke |
| 6,077,554 A | 6/2000 | Wiemann et al. |
| 6,105,815 A | 8/2000 | Mazda et al. |
| 6,213,325 B1 | 4/2001 | Cheng et al. |
| 6,228,317 B1 | 5/2001 | Smith et al. |
| 6,230,912 B1 | 5/2001 | Rashid |
| 6,277,321 B1 | 8/2001 | Valliencourt et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,662,960 B2 | 12/2003 | Hong et al. |
| 6,749,780 B2 | 6/2004 | Tobias |
| 6,763,968 B1 | 7/2004 | Boyd et al. |
| 6,769,561 B2 | 8/2004 | Futral et al. |
| 6,779,673 B2 | 8/2004 | Melrose et al. |
| 6,923,334 B2 | 8/2005 | Melrose et al. |
| 6,935,525 B2 | 8/2005 | Trude |
| 6,942,116 B2 | 9/2005 | Lisch et al. |
| 6,983,858 B2 | 1/2006 | Slat et al. |
| 7,051,889 B2 | 5/2006 | Boukobza |
| 7,077,279 B2 | 7/2006 | Melrose |
| 7,137,520 B1 | 11/2006 | Melrose |
| 7,150,372 B2 | 12/2006 | Lisch et al. |
| 7,159,374 B2 | 1/2007 | Abercrombie, III et al. |
| 7,219,480 B2 | 5/2007 | Winters et al. |
| 7,367,365 B2 | 5/2008 | Slat et al. |
| 7,520,400 B2 | 4/2009 | Young et al. |
| 7,717,282 B2 | 5/2010 | Melrose |
| 7,726,106 B2 | 6/2010 | Kelley et al. |
| 7,735,304 B2 | 6/2010 | Kelley et al. |
| 7,926,243 B2 | 4/2011 | Kelley et al. |
| 8,127,955 B2 | 3/2012 | Denner et al. |
| 8,152,010 B2 | 4/2012 | Melrose et al. |
| 8,381,940 B2 | 2/2013 | Melrose et al. |
| 8,584,879 B2 * | 11/2013 | Melrose .................. B29C 49/06 215/373 |
| 8,627,944 B2 | 1/2014 | Kelley |
| 8,720,163 B2 | 5/2014 | Melrose et al. |
| 9,211,968 B2 | 12/2015 | Melrose |
| 9,387,971 B2 * | 7/2016 | Melrose ............... B65D 1/0284 |
| 9,624,018 B2 | 4/2017 | Melrose |
| 9,764,873 B2 | 9/2017 | Bysick |
| 2001/0035391 A1 | 11/2001 | Young et al. |
| 2002/0074336 A1 | 6/2002 | Silvers |
| 2002/0096486 A1 | 7/2002 | Bourque et al. |
| 2002/0153343 A1 | 10/2002 | Tobias et al. |
| 2002/0158038 A1 | 10/2002 | Helsel et al. |
| 2003/0015491 A1 | 1/2003 | Melrose et al. |
| 2003/0186006 A1 | 10/2003 | Schmidt et al. |
| 2003/0196926 A1 | 10/2003 | Tobias et al. |
| 2003/0217947 A1 | 11/2003 | Ishikawa et al. |
| 2004/0016716 A1 | 1/2004 | Melrose et al. |
| 2004/0074864 A1 | 4/2004 | Melrose et al. |
| 2004/0149677 A1 | 8/2004 | Slat et al. |
| 2004/0173565 A1 | 9/2004 | Semersky et al. |
| 2004/0173656 A1 | 9/2004 | Seong |
| 2004/0211746 A1 | 10/2004 | Trude |
| 2004/0232103 A1 | 11/2004 | Lisch et al. |
| 2005/0011580 A1 | 1/2005 | Ziegler et al. |
| 2006/0006133 A1 | 1/2006 | Lisch et al. |
| 2006/0138074 A1 | 6/2006 | Melrose |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125742 A1 | 6/2007 | Simpson, Jr. et al. |
| 2007/0125743 A1 | 6/2007 | Pritchett et al. |
| 2007/0181403 A1 | 8/2007 | Sheets et al. |
| 2007/0184157 A1 | 8/2007 | Stegmaier |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2009/0126323 A1 | 5/2009 | Kelley et al. |
| 2010/0018838 A1 | 1/2010 | Kelley |
| 2010/0119743 A1 | 5/2010 | Thomasset |
| 2010/0212260 A1 | 8/2010 | Clusserath |
| 2014/0224813 A1 | 8/2014 | Bysick |

FOREIGN PATENT DOCUMENTS

| | | |
|---|---|---|
| DE | 1158398 B | 11/1963 |
| DE | 1761753 | 1/1972 |
| DE | 2102319 | 8/1972 |
| DE | 3611391 A1 | 10/1987 |
| DE | 3215866 | 11/1993 |
| EP | 346518 | 12/1989 |
| EP | 0521642 | 1/1993 |
| EP | 0551788 | 7/1993 |
| EP | 0666222 | 8/1995 |
| EP | 0609348 | 1/1997 |
| EP | 0916406 | 5/1999 |
| EP | 0957030 | 11/1999 |
| EP | 1063076 | 12/2000 |
| EP | 1565381 | 8/2005 |
| EP | 1975116 A1 | 10/2008 |
| FR | 1571499 | 6/1969 |
| FR | 2607109 | 5/1988 |
| GB | 0781103 | 8/1957 |
| GB | 1113988 | 5/1968 |
| GB | 2050919 | 1/1981 |
| GB | 2372977 | 9/2002 |
| GE | 200677 U | 8/2000 |
| JP | 48-31050 | 9/1973 |
| JP | 49-28628 | 7/1974 |
| JP | 54-72181 | 6/1979 |
| JP | 56-072730 | 6/1981 |
| JP | 55-114717 | 2/1982 |
| JP | 63-189224 | 8/1988 |
| JP | 64-009146 | 1/1989 |
| JP | 03-43342 | 2/1991 |
| JP | 03-076625 | 4/1991 |
| JP | 05-193694 | 8/1992 |
| JP | 06-336238 | 12/1994 |
| JP | 07-300121 | 11/1995 |

(56) References Cited

FOREIGN PATENT DOCUMENTS

| | | |
|---|---|---|
| JP | 8053115 | 2/1996 |
| JP | 08-253220 | 10/1996 |
| JP | 09-039934 | 2/1997 |
| JP | 09-110045 | 4/1997 |
| JP | 10-167226 | 6/1998 |
| JP | 10-181734 | 7/1998 |
| JP | 10-230919 | 9/1998 |
| JP | 2000-168756 | 6/2000 |
| JP | 2000-229615 | 8/2000 |
| JP | 2002-127237 | 5/2002 |
| JP | 2006-501109 | 1/2006 |
| NZ | 240448 | 6/1995 |
| NZ | 296014 | 10/1998 |
| NZ | 335565 | 10/1999 |
| NZ | 506684 | 8/2000 |
| NZ | 512423 | 6/2001 |
| NZ | 521694 | 10/2003 |
| RU | 2021956 | 10/1994 |
| RU | 2096288 | 11/1997 |
| WO | WO 93/09031 | 5/1993 |
| WO | WO 93/12975 | 7/1993 |
| WO | WO 94/05555 | 3/1994 |
| WO | WO 97/03885 | 2/1997 |
| WO | WO 97/014617 | 4/1997 |
| WO | WO 97/034808 | 9/1997 |
| WO | WO 99/021770 | 5/1999 |
| WO | WO 00/51895 | 9/2000 |
| WO | WO 01/040081 | 6/2001 |
| WO | WO 02/02418 | 1/2002 |
| WO | WO 02/18213 | 3/2002 |
| WO | WO 02/085755 | 10/2002 |
| WO | WO 04/028910 | 4/2004 |
| WO | WO 04/106175 | 12/2004 |
| WO | WO 04/106176 | 12/2004 |
| WO | WO 05/012091 | 2/2005 |
| WO | WO 2005070815 A1 | 8/2005 |
| WO | WO 2005/085082 | 9/2005 |
| WO | WO 2005115908 A1 | 12/2005 |
| WO | WO 06/113428 | 10/2006 |
| WO | WO 07/127337 | 11/2007 |
| WO | WO 2009/142510 | 11/2009 |
| WO | WO 2011/062512 | 5/2011 |

OTHER PUBLICATIONS

IPRP (including Written Opinion) for PCT/US/2004/024581 dated Jan. 30, 2006.
IPRP for PCT/NZ03/00220, dated Jan. 11, 2005.
IPRP with Written Opinion for PCT/US2007/010182, dated Oct. 28, 2008.
ISR for PCT/NZ01/000176 (WO 02/018213) dated Nov. 8, 2001.
ISR for PCT/NZ03/00220, dated Nov. 27, 2003.
European Search Report (suppl.) of EP 03748817, dated Jul. 9, 2007.
ISR for PCT/US2004/016405 dated Feb. 15, 2005.
IPRP (including Written Opinion) for PCT/US/2004/016405 dated Nov. 25, 2005.
National Intellectual Property Center of Georgia "SAKPATENTI", Search Report in Filing No. 8770/01, Application No. AP2003 008770, GE19049, dated Mar. 1, 2006.
ISR for PCT/US2007/010182, dated Oct. 19, 2007, 3 pp.
Office Action for European App. No. 07794381.9 dated Nov. 21, 2012.
Office Action for European App. No. 07794381.9 dated Dec. 8, 2011.
U.S. Appl. No. 10/529,198, Melrose File History.
U.S. Appl. No. 11/413,124, Melrose File History.
U.S. Appl. No. 112/325,452, Kelley File History.
U.S. Appl. No. 13/442,846, Melrose File History.
Ash, Stuart, International Search Report, PCT/NZ2011/000243, dated Mar. 14, 2012, 3 pp., Australian Patent Office.
EPO machine translation of DE 3611391, retrieved Mar. 18, 2016, 18 pages.
EPO machine translation of DE 1158398, retrieved Mar. 18, 2016, 8 pages.
File History of U.S. Appl. No. 14/255,662, filed Apr. 17, 2014, published as 2014-0224813, now U.S. Pat. No. 9,764,873.

* cited by examiner

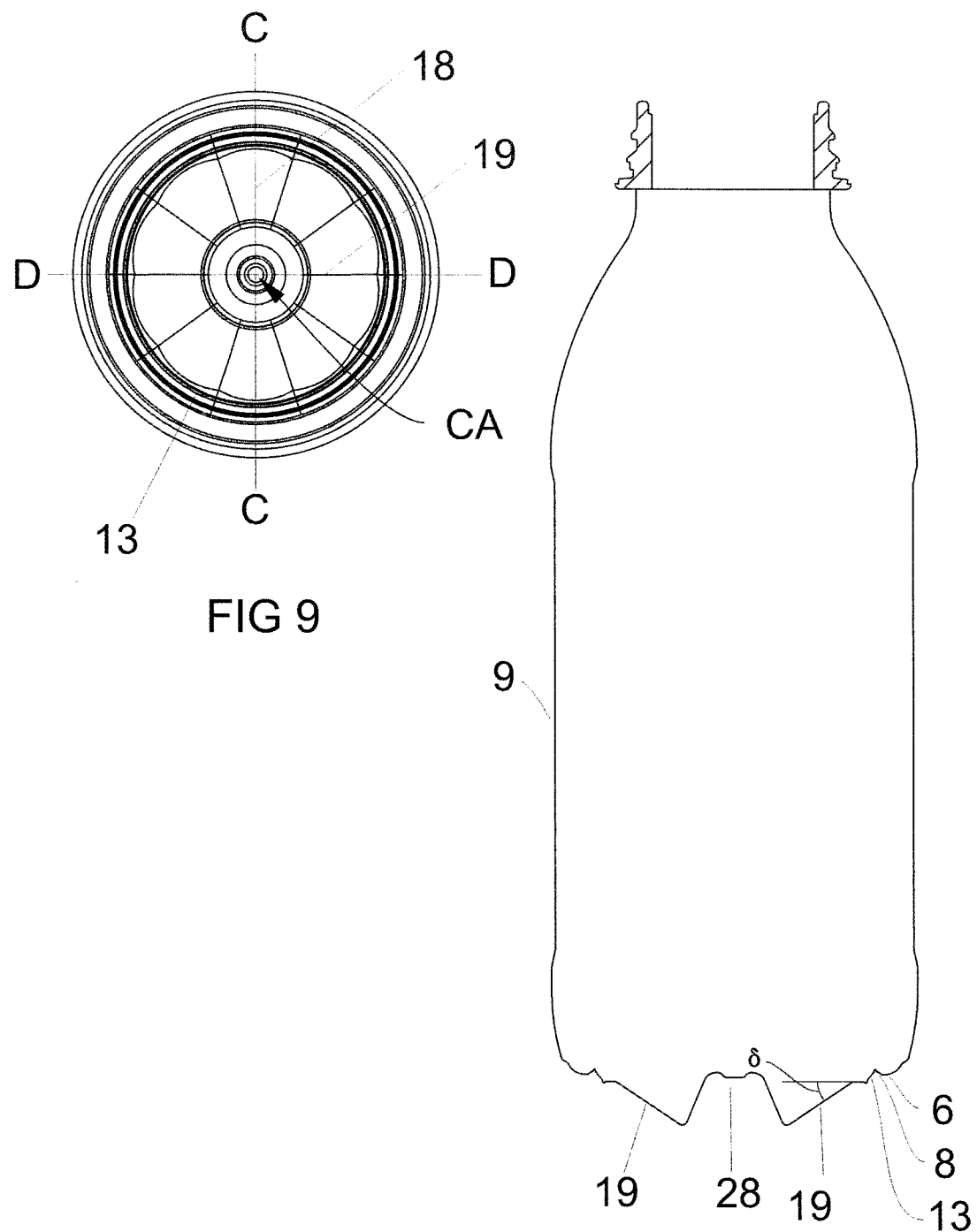

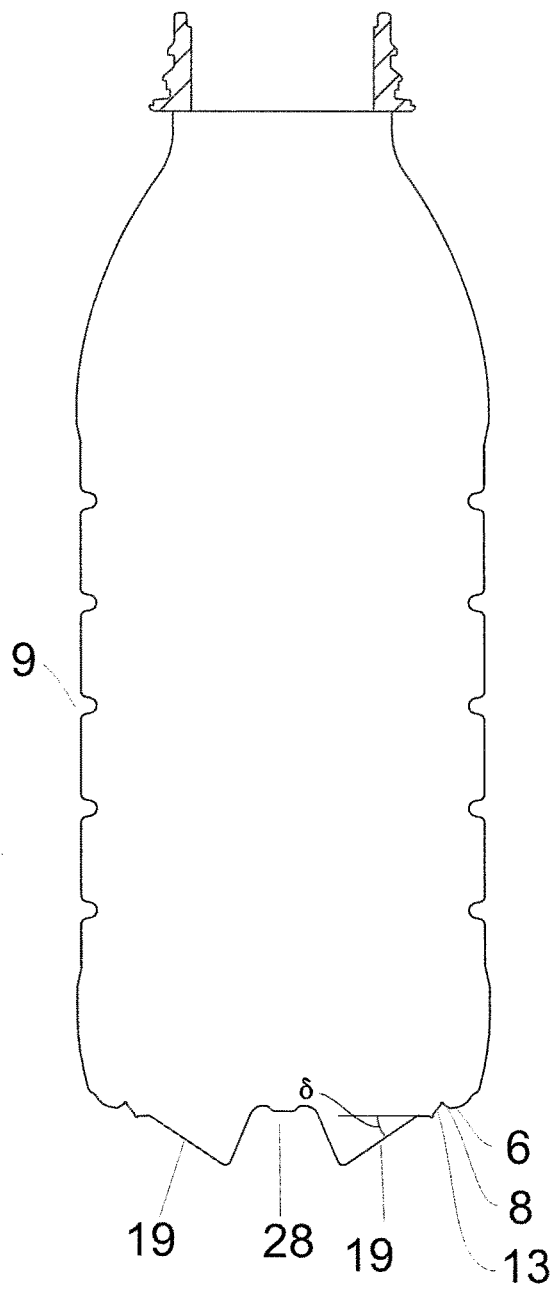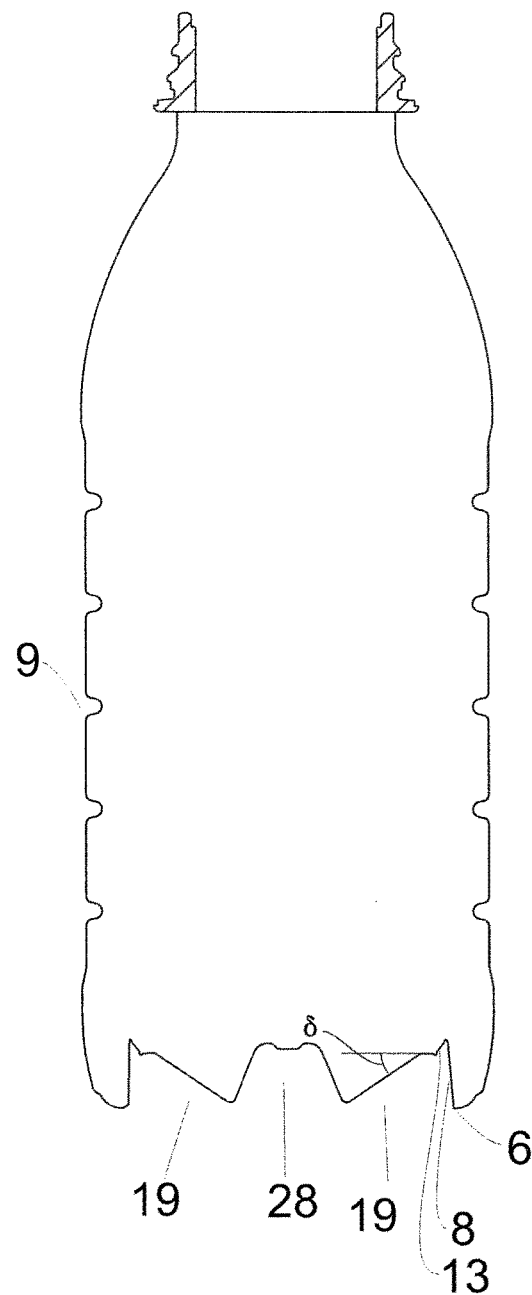
FIG 20
FIG 21

CONTAINER STRUCTURE FOR REMOVAL OF VACUUM PRESSURE

CROSS REFERENCE TO RELATED APPLICATIONS

This application is a Continuation of Ser. No. 13/442,846, filed Apr. 9, 2012, published as US2013/0068779, now U.S. Pat. No. 9,211,968; this application is also a Continuation of Ser. No. 14/187,217, filed Feb. 21, 2014, published as US20140166676, currently pending, and this application is also a Continuation of U.S. Ser. No. 14/187,227, filed Feb. 22, 2014, published as US2014/0165504, currently pending, and application Ser. Nos. 13/442,846, 14/187,217, and 14/187,227 are each Continuations of Ser. No. 10/529,198, filed Dec. 15, 2005, published as US2006/0138074, now U.S. Pat. No. 8,152,010, which is a Section 371 of PCT/NZ03/00220, filed Sep. 30, 2003, published as WO/2004/028910, which claims priority to NZ521694 filed Sep. 30, 2002, the content of all of which are hereby incorporated by reference.

FIELD

This invention relates generally to a container structure that allows for the removal of vacuum pressure. This is achieved by inverting a transversely oriented vacuum pressure panel located in the lower end-wall, or base region of the container.

BACKGROUND

So called 'hot fill' containers are well known in prior art, whereby manufacturers supply PET containers for various liquids which are filled into the containers and the liquid product is at an elevated temperature, typically at or around 85 degrees C. (185 degrees F.).

The container is manufactured to withstand the thermal shock of holding a heated liquid, resulting in a 'heat-set' plastic container. This thermal shock is a result of either introducing the liquid hot at filling, or heating the liquid after it is introduced into the container.

Once the liquid cools down in a capped container, however, the volume of the liquid in the container reduces, creating a vacuum within the container. This liquid shrinkage results in vacuum pressures that pull inwardly on the side and end walls of the container. This in turn leads to deformation in the walls of plastic bottles if they are not constructed rigidly enough to resist such force.

Typically, vacuum pressures have been accommodated by the use of vacuum panels, which distort inwardly under vacuum pressure. Prior art reveals many vertically oriented vacuum panels that allow containers to withstand the rigors of a hot fill procedure. Such vertically oriented vacuum panels generally lie parallel to the longitudinal axis of a container and flex inwardly under vacuum pressure toward this longitudinal axis.

In addition to the vertically oriented vacuum panels, many prior art containers also have flexible base regions to provide additional vacuum compensation. Many prior art containers designed for hot-filling have various modifications to their end-walls, or base regions to allow for as much inward flexure as possible to accommodate at least some of the vacuum pressure generated within the container.

All such prior art, however, provides for flat or inwardly inclined, or recessed base surfaces. These have been modified to be susceptible to as much further inward deflection as possible. As the base region yields to the force, it is drawn into a more inclined position than prior to having vacuum force applied.

Unfortunately, however, the force generated under vacuum to pull longitudinally on the base region is only half that force generated in the transverse direction at the same time. Therefore, vertically oriented vacuum panels are able to react to force more easily than a panel placed in the base. Further, there is a lot more surface area available around the circumference of a container than in the end-wall. Therefore, adequate vacuum compensation can only be achieved by placing vertically-oriented vacuum panels over a substantial portion of the circumferential wall area of a container, typically 60% of the available area.

Even with such substantial displacement of vertically-oriented panels, however, the container requires further strengthening to prevent distortion under the vacuum force.

The liquid shrinkage derived from liquid cooling, causes a build up of vacuum pressure. Vacuum panels deflect toward this negative pressure, to a degree lessening the vacuum force, by effectively creating a smaller container to better accommodate the smaller volume of contents. However, this smaller shape is held in place by the generating vacuum force. The more difficult the structure is to defied inwardly, the more vacuum force will be generated. In prior art, a substantial amount of vacuum is still present in the container and this tends to distort the overall shape unless a large, annular strengthening ring is provided in horizontal, or transverse, orientation at least a ⅓ of the distance from an end to the container.

Considering this, it has become accepted knowledge to believe that it is impossible to provide for full vacuum compensation through modification to the end-wall or base region alone. The base region offers very little surface area, compared to the side walls, and reacts to force at half the rate of the side walls.

Therefore it has become accepted practice to only expect partial assistance to the overall vacuum compensation to be generated through the base area. Further, even if the base region could provide for enough flexure to accommodate all liquid shrinkage within the container, there would be a significant vacuum force present, and significant stress on the base standing or bearing ring. This would place force on the sidewalls also, and to prevent distortion the smooth sidewalls would have to be much thicker in material distribution, be strengthened by ribbing or the like, or be placed into shapes more compatible to mechanical distortion (for example be square instead of circular).

For this reason it has not been possible to provide container designs in plastic that do not have typical prior art vacuum panels that are vertically oriented on the sidewall. Many manufacturers have therefore been unable to commercialize plastic designs that are the same as their glass bottle designs with smooth sidewalls.

U.S. Pat. No. 6,595,380 (Silvers), claims to provide for full vacuum compensation through the base region without requiring positioning of vertically oriented vacuum panels on the smooth sidewalls. This is suggested by combining techniques well-known and practiced in the prior art. Silvers provides for a slightly inwardly domed, and recessed base region to provide further inward movement under vacuum pressure. However, the technique disclosed, and the stated percentage areas required for efficiency are not considered by the present applicant to provide a viable solution to the problem.

In fact, flexure in the base region is recognised to be greatest in a horizontally flat base region, and maximizing such flat portions on the base has been well practiced and found to be unable to provide enough vacuum compensation to avoid also employing vertically oriented vacuum panels.

Silvers does provide for the base region to be strengthened by coupling it to the standing or bearing ring of the container, in order to assist preventing unwanted outward movement of the inwardly inclined or flat portion when a heated liquid builds up initial internal pressure in a newly filled and capped container. This coupling is achieved by rib structures, which also serve to strengthen the flat region. Whilst this may strengthen the region in order to allow more vacuum force to be applied to it, the ribs conversely further reduce flexibility within the base region, and therefore reduce flexibility.

It is believed by the present applicant that the specific 'ribbed' method proposed by Silvers could only provide for approximately 35% of the vacuum compensation that is required, as the modified end-wall is not considered capable of sufficient inward flexure to fully account for the liquid shrinkage that would occur. Therefore a strong maintenance of vacuum pressure is expected to occur. Containers employing such base structure therefore still require significant thickening of the sidewalls, and as this is done the base region also becomes thicker during manufacturing. The result is a less flexible base region, which in turn also reduces the efficiency of the vacuum compensation achieved.

The present invention relates to a hot-fill container which is a development of the hot-fill container described in our international application WO 02/18213 (the PCT specification), which specification is incorporated herein in its entirety where appropriate.

The PCT specification backgrounds the design of hot-fill containers and the problems with such designs which were overcome or at least ameliorated by the design disclosed in the PCT specification.

In the PCT specification a semi-rigid container was provided that had a substantially vertically folding vacuum panel portion. Such a transversely oriented vacuum panel portion included an initiator portion and a control portion which generally resisted being expanded from the collapsed state.

Further described in the PCT specification is the inclusion of the vacuum panels at various positions along the container wall.

A problem exists when locating such a panel in the end-wall or base region, whereby stability may be compromised if the panel does not move far enough into the container longitudinally to no longer form part of the container touching the surface the container stands on.

A further problem exists when utilizing a transverse panel in the base end-wall due to the potential for shock deflection of the inverted panel when a full and capped container is dropped. This may occur on a container with soft and unstructured walls that is dropped directly on its side. The shock deflection of the sidewalls causes a shock-wave of internal pressure that acts on the panel. In such cases improved panel configurations are desired that further prevent panel roll-out, or initiator region configurations utilized that optimize for resistance to such reversion displacement.

In view of the above, it is an object of one preferred embodiment of the present invention to provide a plastic container structure having a transversely oriented pressure panel in its lower portion that can provide for removal of vacuum pressure such that there is substantially no remaining force within the container.

It is a further object of one preferred embodiment of the present invention to provide a container which has a transversely oriented pressure panel that is decoupled to a degree from the adjoining wall such that greater inward and longitudinal movement can be achieved.

It is a further object of one preferred embodiment of the present invention to provide for a container to have a transversely oriented pressure panel that is inwardly displaced to a position above the standing or bearing ring of the final container configuration, such that a new base region is formed with a greater standing or bearing ring or foot print area, and the pressure panel is substantially protected from top load force applied to the container during commercial distribution.

It is a further object of one preferred embodiment of the present invention to provide for an improved transverses oriented pressure panel having an initiator portion which may utilize essentially the same angle as the control portion, such that greater removal of vacuum pressure can be obtained and such that greater resistance to outward deflection can also be obtained.

A further and alternative object of the present invention in all its embodiments, all the objects to be read disjunctively, is to at least provide the public with a useful choice.

SUMMARY

According to one aspect of the present invention there is provided a container having a longitudinal axis, an upper portion having an opening into said container, a body portion extending from said upper portion to a lower portion, said lower portion including a base, said base closing off an end of said container, said container having at least one substantially transversely oriented pressure panel portion located in said lower portion, said pressure panel portion being capable of folding from one longitudinally inclined position to an inverted position to compensate for a change of pressure induced within the container.

According to a further aspect of the present invention a container has a longitudinal axis and a base, and at least one substantially transversely oriented vacuum panel portion located adjacent to said base, said vacuum panel portion being adapted in use to fold from a longitudinally inclined position to an inverted position to compensate for a change of pressure induced within the container following cooling of a liquid within the container after it has been capped, such that less force is exerted on the internal walls of said container.

According to a further aspect of the present invention a container has a longitudinal axis, a side wall and a base closing off one end, said container having a single substantially transversely oriented vacuum panel portion located within the base and joined to the side wall by a decoupling or hinge structure or element, said vacuum panel portion being adapted in use to fold from a longitudinally inclined position to an inverted position to compensate for 2 change of pressure induced within the container.

Preferably in one embodiment the vacuum panel portion may include an initiator section and a control section, said initiator section providing for folding before said control section.

Preferably in one embodiment a decoupling structure connects the pressure panel portion with the body portion and is of an area which allows for greater inward and upward longitudinal movement of the pressure panel.

Preferably in one embodiment the vacuum panel portion has no strengthening ribs to restrain substantial longitudinal movement and inversion.

Preferably in one embodiment the vacuum panel portion may include fluting structures or the like to allow an even circumferential distribution of folding forces to provide for increased control over folding the panel portion from one inclined position to another and to assist in preventing unwanted return to the original position.

Preferably in one embodiment after folding, the container standing or bearing support or surface is provided by a lower part of the container sidewall that provides a replacement container standing or bearing support or surface.

According to a further aspect of the invention a method of compensating for a change in pressure in a container as defined in any one of the preceding eight paragraphs is provided in which said method includes applying a force to the or each said panel portion to cause said folding to occur.

According to a further aspect of this invention there is provided a hot-fill container substantially as herein described with reference to any one of the embodiments of the accompanying drawings.

Further aspects of the invention which should be considered in all its novel aspects will become apparent from the following description.

These and other examples are set forth more fully below in conjunction with drawings, a brief description of which follows.

BRIEF DESCRIPTION OF THE DRAWINGS

FIG. 9: shows an underneath view of the base of the container of FIGS. 8a and 8b and FIG. 10a before collapsing FIG. 10a: shows a cross-sectional view of the container shown in FIG. 9 through line D-D prior to movement of the vacuum panel;

FIG. 20: shows a cross-sectional view of the container shown in FIGS. 8-10a through line D-D with the container sidewall including ribs; and FIG. 21: shows a cross-sectional view of the container shown in FIG. 10b with the pressure panel in a pre-collapsed state and with the container sidewall including ribs.

DETAILED DESCRIPTION

Figure 1:
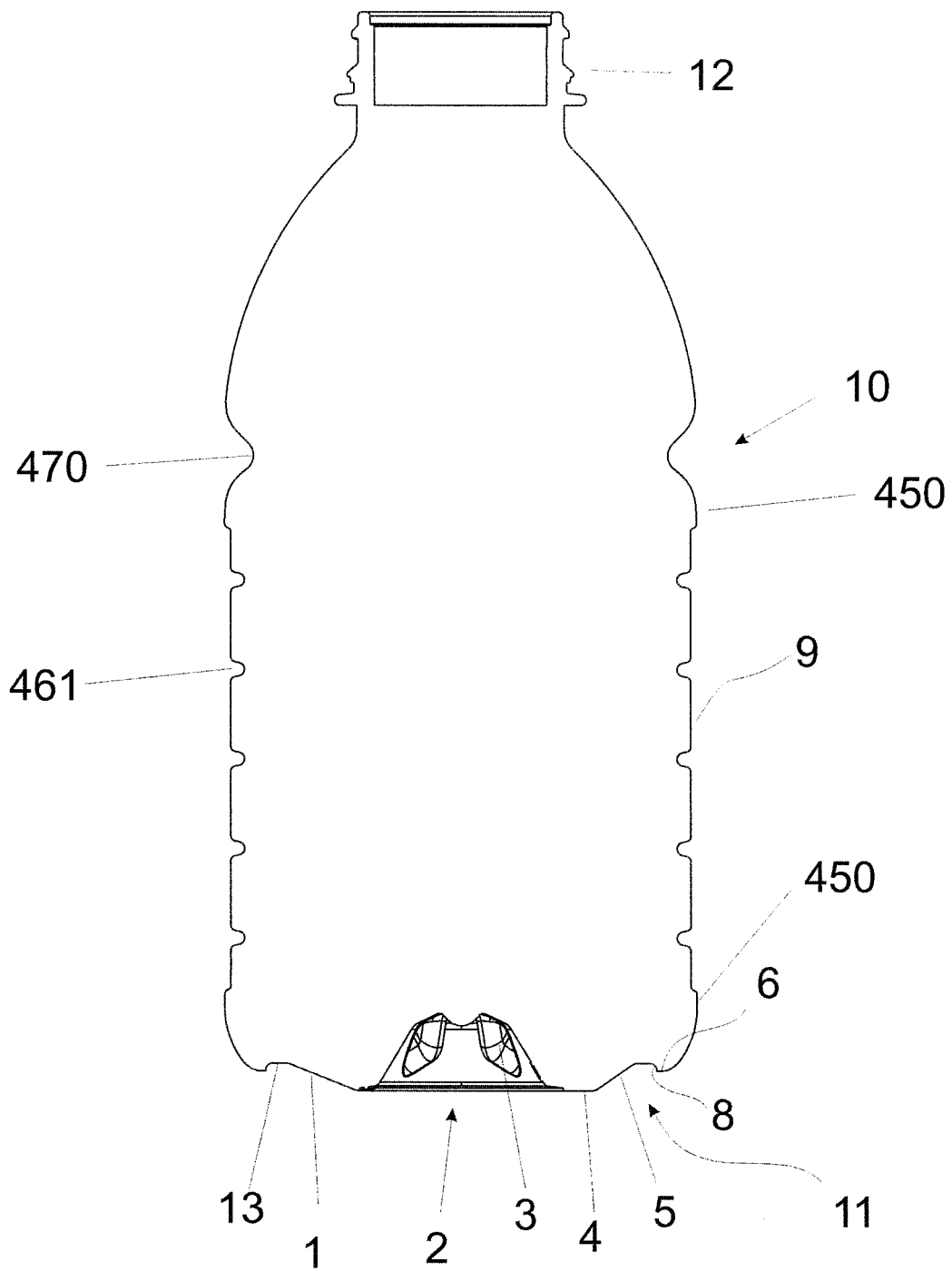
FIG. 1: shows a cross-sectional view of a hot-fill container according to one possible embodiment of the invention in its pre-collapsed condition.

The following description of preferred embodiments is merely exemplary in nature, and is in no way intended to limit the invention or its application or uses.

As discussed above, to accommodate vacuum forces during cooling of the contents within a heat set container, containers have typically been provided with a series of vacuum panels around their sidewalls and an optimized base portion. The vacuum panels deform inwardly, and the base deforms upwardly, under the influence of the vacuum forces. This prevents unwanted distortion elsewhere in the container. However, the container is still subjected to internal vacuum force. The panels and base merely provide a suitably resistant structure against that force. The more resistant the structure the more vacuum force will be present. Additionally, end users can feel the vacuum panels when holding the containers.

As well-known in the prior art, and disclosed in Silvers '830, typically at a bottling plant the containers will be filled with a hot liquid and then capped and allowed to reside at generally about the filling temperature for approximately five minutes, typically during transfer from the capper, before being transferred through a Cooling Tunnel and actively cooled while subjected to a cold water spray resulting in the formation of a vacuum within the container which the container structure needs to be able to cope with. The containers are then transferred to labelling, packaging and shipping operations. The present invention relates to hot-fill containers and a structure that provides for the substantial removal or substantial negation of vacuum pressure. This allows much greater design freedom and light weighting opportunities as there is no longer any requirement for the structure to be resistant to vacuum forces which would otherwise mechanically distort the container.

As mentioned above and in the PCT specification, various proposals for hot-fill container designs have been put forward.

Further development of the hot-ill container of the PCT specification has positioned an outwardly inclined and transversely oriented vacuum panel between the lower portion of the side wall and the inwardly domed base region. In this position the container has poor stability, insofar as the base region is very narrow in diameter and does not allow for a good standing or bearing ring support. Additionally, there is preferably provided a decoupling structure that provides a hinge joint to the juncture of the vacuum panel and the lower sidewall. This decoupling structure provides for a larger range of longitudinal movement of the vacuum panel than would occur if the panel was coupled to the side wall by way of ribs for example. One side of the decoupling structure remains adjacent the sidewall, allowing the opposite side of the decoupling structure, adjacent to an initiator portion to bend inwardly and upwardly. The decoupling structure therefore provides for increased deflection of the initiator portion, allowing increased movement of the panel portion longitudinally away from the previously outwardly inclined position, enabling the panel portion to fold inwardly relative to the container and upwardly relative to the initial base position. The lower sidewall is therefore subjected to lower force during such inversion. During this action, the base portion is translated longitudinally upward and into the container.

Further, as the panel portion folds inwardly and upwardly, the decoupling structure allows for the vacuum panel to now form part of the container base portion. This development has at least two important advantages.

Firstly, by providing the vacuum panel so as to form part of the base after folding, a mechanical force can now be provided immediately against the panel in order to apply inverting force. This allows much greater control over the action, which may for example be applied by a mechanical pusher, which would engage with the container base in resetting the container shape. This allows increased design options for the initiator portion.

Secondly, the transversely oriented vacuum panel is effectively completely removed from view as it is forced from an outward position to an inward position. This means that there are no visible design features being imposed on the major portion of the side wall of the container in order to incorporate vacuum compensation. If required therefore, the major portion of the side wall of the present invention could have no structural features and the container could, if required, replicate a clear wall glass container. Alternatively, as there will be little or no vacuum remaining in the container after the panel is inverted, any design or shape can now be utilized, without regard for integrity against vacuum forces found in other hot-fill packages.

Such a manoeuvre allows for a wide standing or bearing ring to be obtained. The decoupling structure provides for the panel to become displaced longitudinally so that there is no contact between any part of the panel or upwardly domed base portion with the contact surface below. A standing or bearing ring is then provided by the lower sidewall immediately adjacent the decoupling structure.

Further, by gaining greater control over the inverting motion and forces, it is possible to allow the initiator portion to share the same steep angle as the control portion. This allows for increased volume displacement during inversion and increased resistance to any reversion back to the original position.

Figures 8A, 8B:
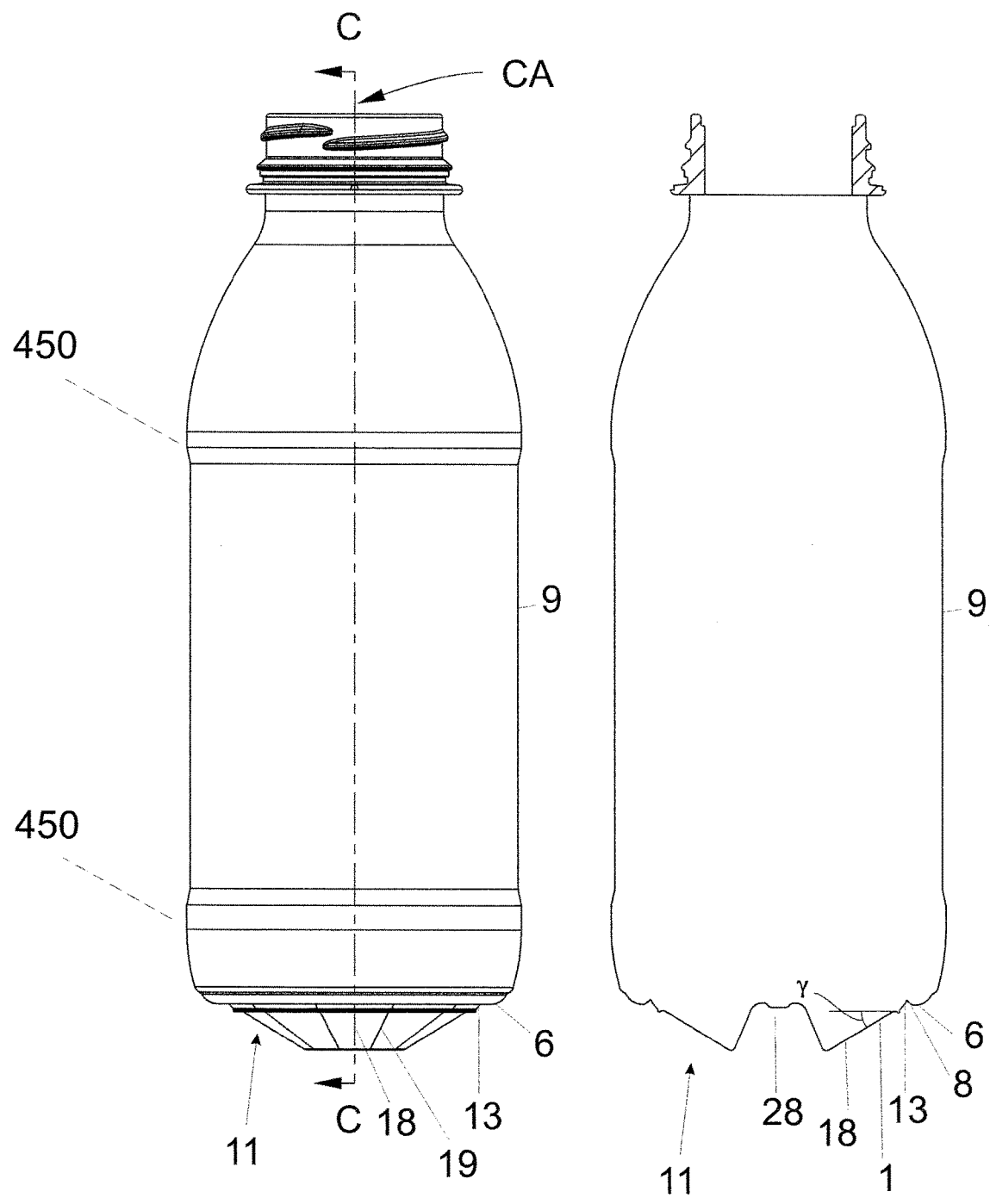
FIG. 8a: shows a side elevation view of a hot-fill container according to an alternative embodiment of the invention in its pre-collapsed condition.
FIG. 8b: shows a cross sectional view of the container shown in FIGS. 8a and 9 through line C-C.
Figure 10B:
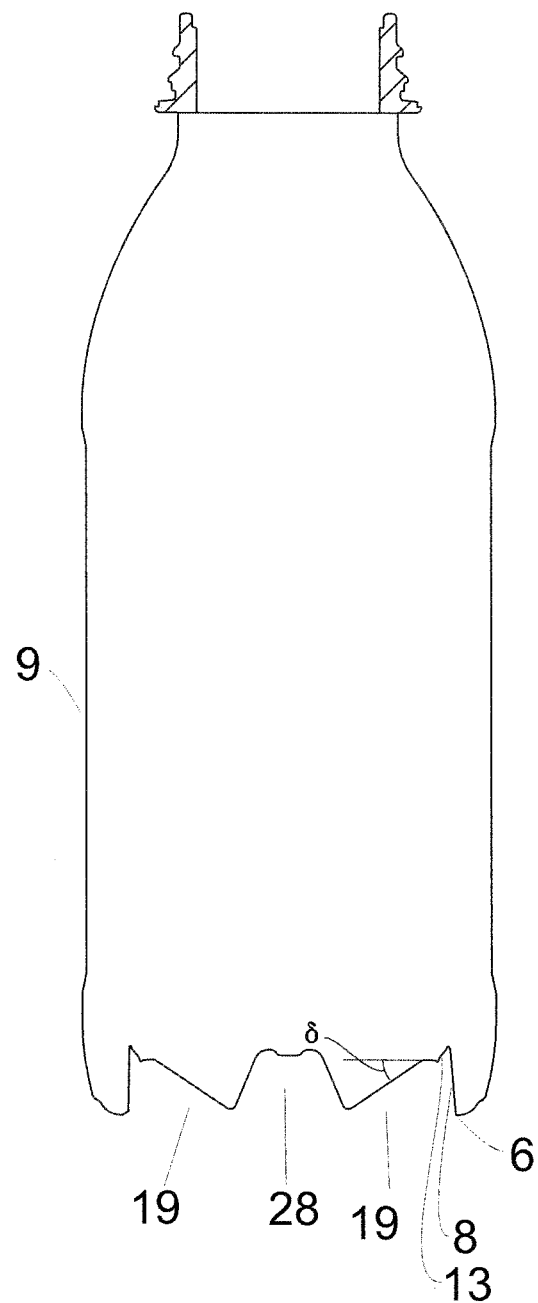
FIG. 10b: shows a cross-sectional view of the container shown in FIG. 9 with the pressure panel in a pre-collapsed state recessed to such an extent it is above the standing surface prior to movement of the vacuum panel just as FIG. 10a is prior to movement of the vacuum panel.

Referring to the accompanying drawings, FIG. 1 shows, by way of example only, and in a diagrammatic cross sectional view, a container in the form of a bottle. This is referenced generally by arrow 10 with a typical neck portion 12 and a side wall 9 extending to a lower portion of the side wall 11 and an underneath base portion 2. As will be appreciated by any skilled person, the sidewall 9 may be radially recessed from touch bumper zones 450 that afford protection to the area between upper and lower touch zones during bottle to bottle contact and label zone protection. As will be further appreciated, the container may also comprise a plurality of annular strengthening rings or ribbings. These may be concentric around the container. These may be in the form of a large concave hoop ring 470, or in the form of smaller rib structures 461. Such structures provide strength against vacuum deformation during cooling of hot filled contents. Alternatively, such structures may be avoided altogether as shown in FIG. 8a, where only the upper and lower touch bumper zones 450 are utilized.

The container 10 will typically be blow moulded from any suitable plastics material but typically this will be polyethylene terephthalate (PET).

The base 2 is shown provided with a plurality of reinforcing ribs 3 so as to form the typical "champagne" base although this is merely by way of example only.

In FIG. 1 the lower side wall portion 11, which operates as a pressure panel, is shown in its unfolded position circumscribing a ring or annular portion 6 is positioned above the level of the bottom of the base 2 and the standing or bearing ring or support section 4 for the container 10.

Figure 2:
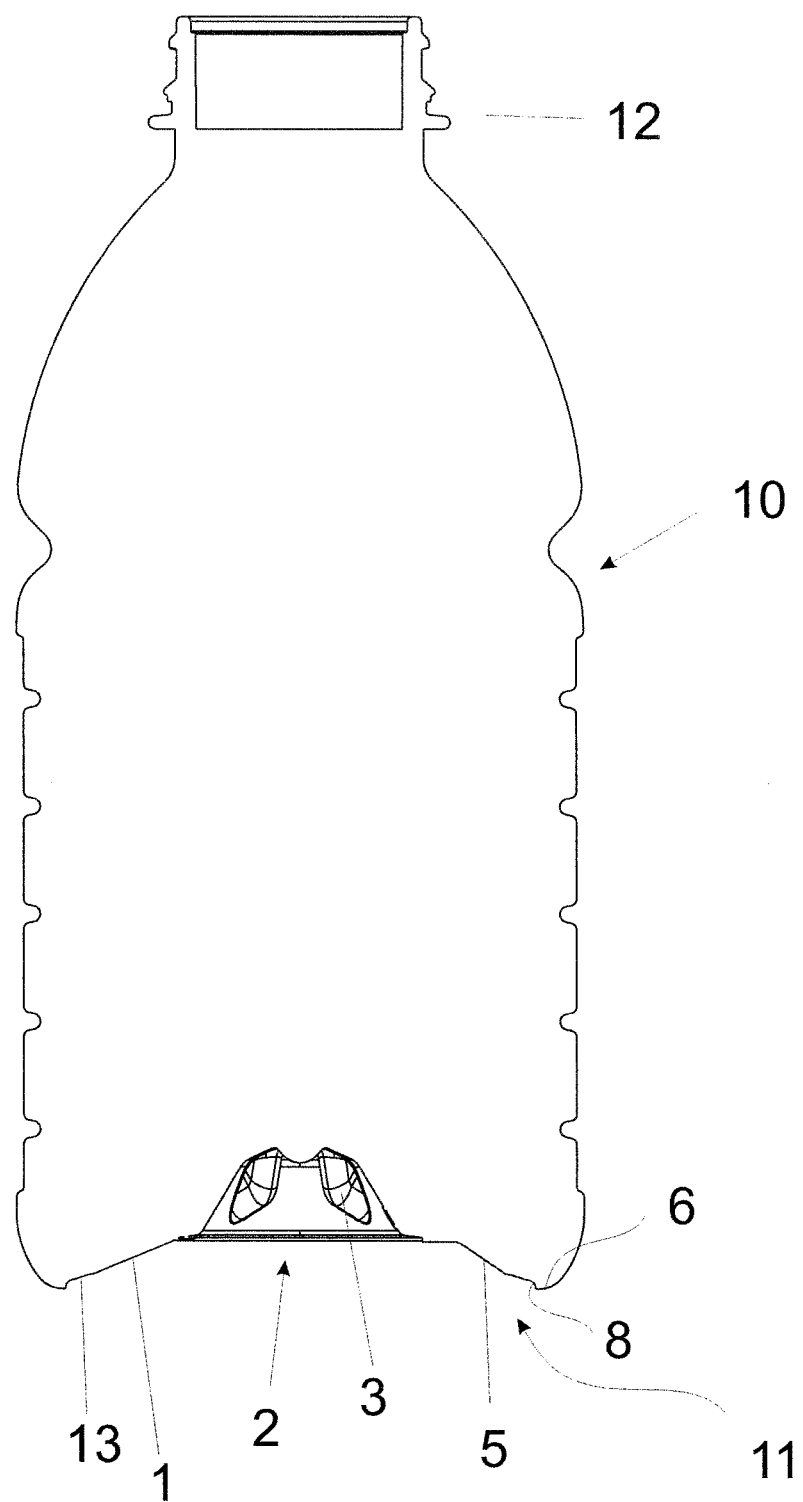
FIG. 2: shows the container of FIG. 1 in its collapsed position.

In FIG. 2 the lower side wall portion 11 is shown having folded inwardly so that the ring or annular portion 6 is positioned below the level of the bottom of the base 2 and is forming the new standing or bearing ring or support for the container 10.

Figure 3:
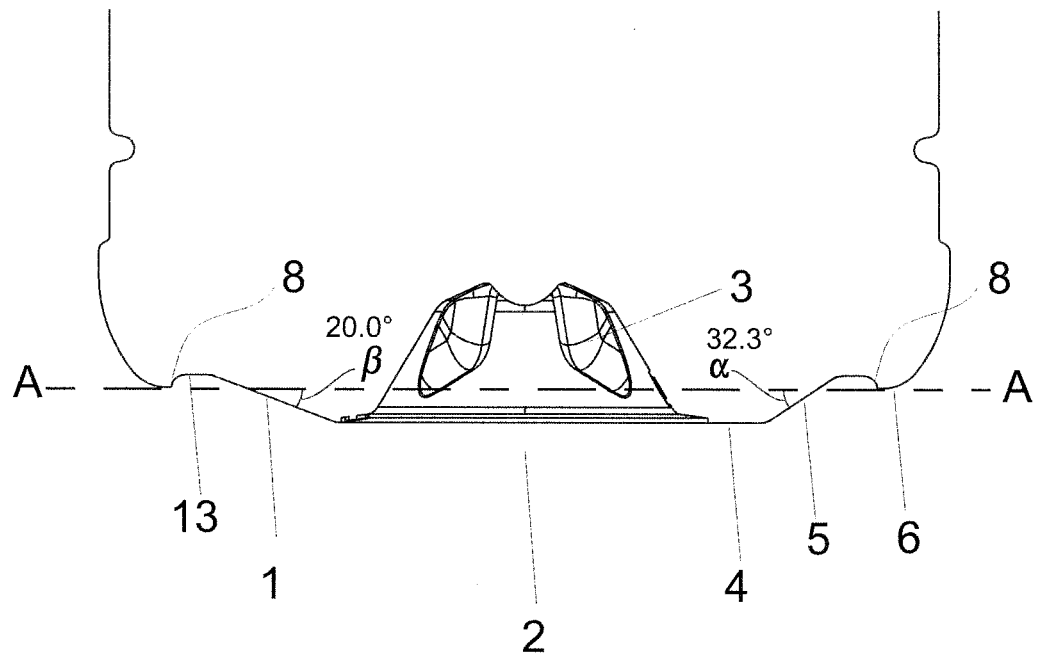
FIG. 3: shows the base of FIG. 1 before collapsing.
Figure 4:
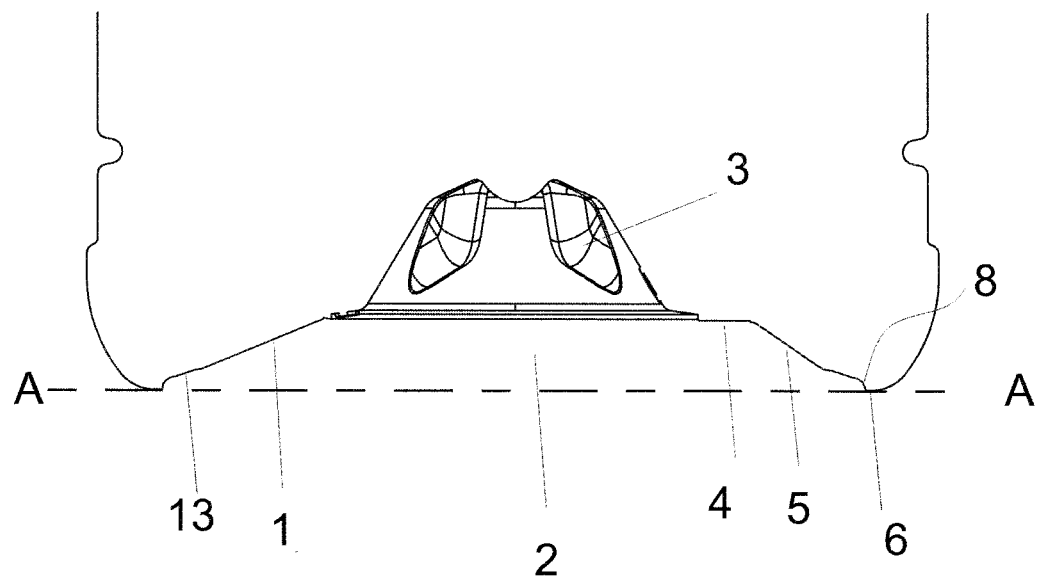
FIG. 4: shows the base of FIG. 2 following collapsing.
Figure 6:
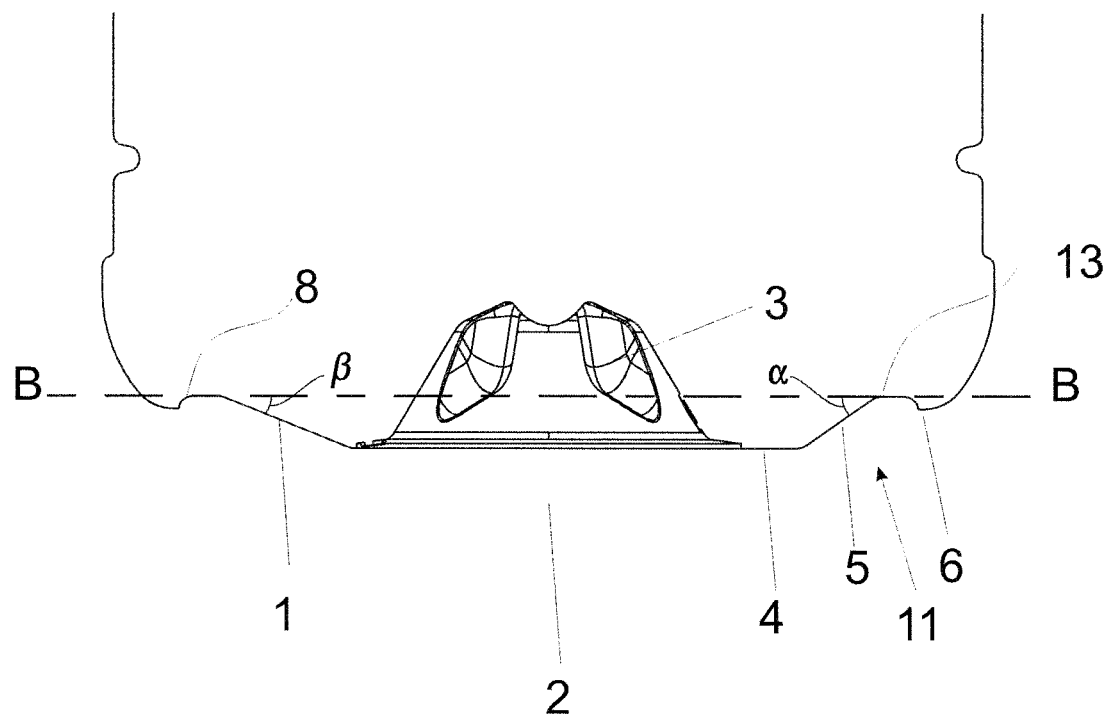
FIG. 6: shows the base of FIG. 1 before collapsing.
Figure 6A:
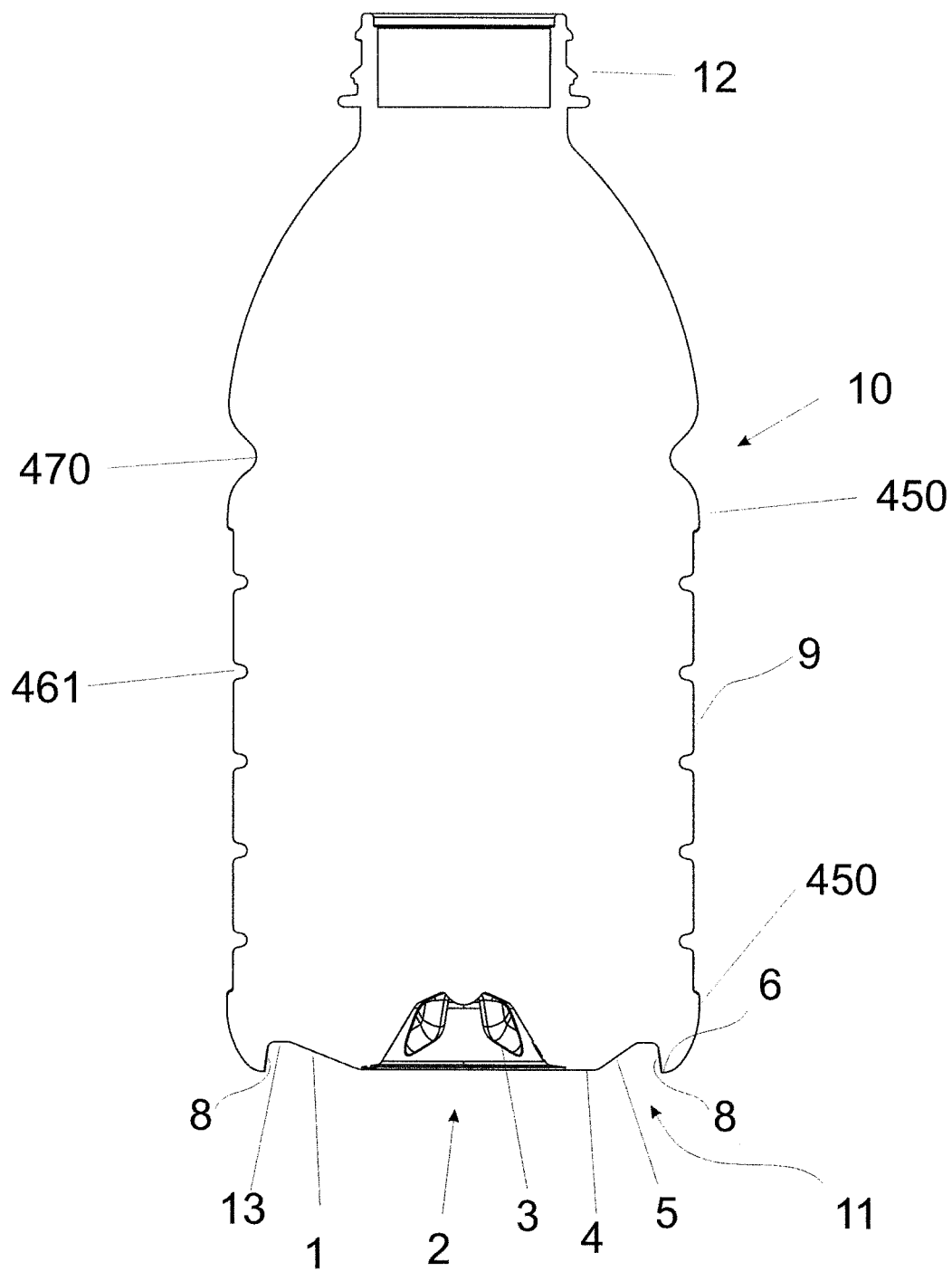
FIG. 6a shows a cross sectional view of an alternative container configuration.

To assist this occurring, and as will be seen particularly in FIGS. 3 and 4, immediately adjacent the standing ring or annular portion 6 there may be an instep or recessed first wall portion 8 extending upwardly to a hinge element or decoupling structure 13, in this case a substantially flat, non-ribbed region, which after folding of the pressure panel 11 about the hinge 13 enables the base portion 2 to effectively completely disappear within the bottom of the container and above the line A-A. Many other configurations for the hinge or decoupling structure 13 are envisioned, however, and as also seen in FIG. 6A, the instep comprises a first wall portion 8 extending in a first direction away from the hinge 13 and the pressure panel 11 comprises a second wall portion extending in a second direction away from the hinge 13.

Figure 5:
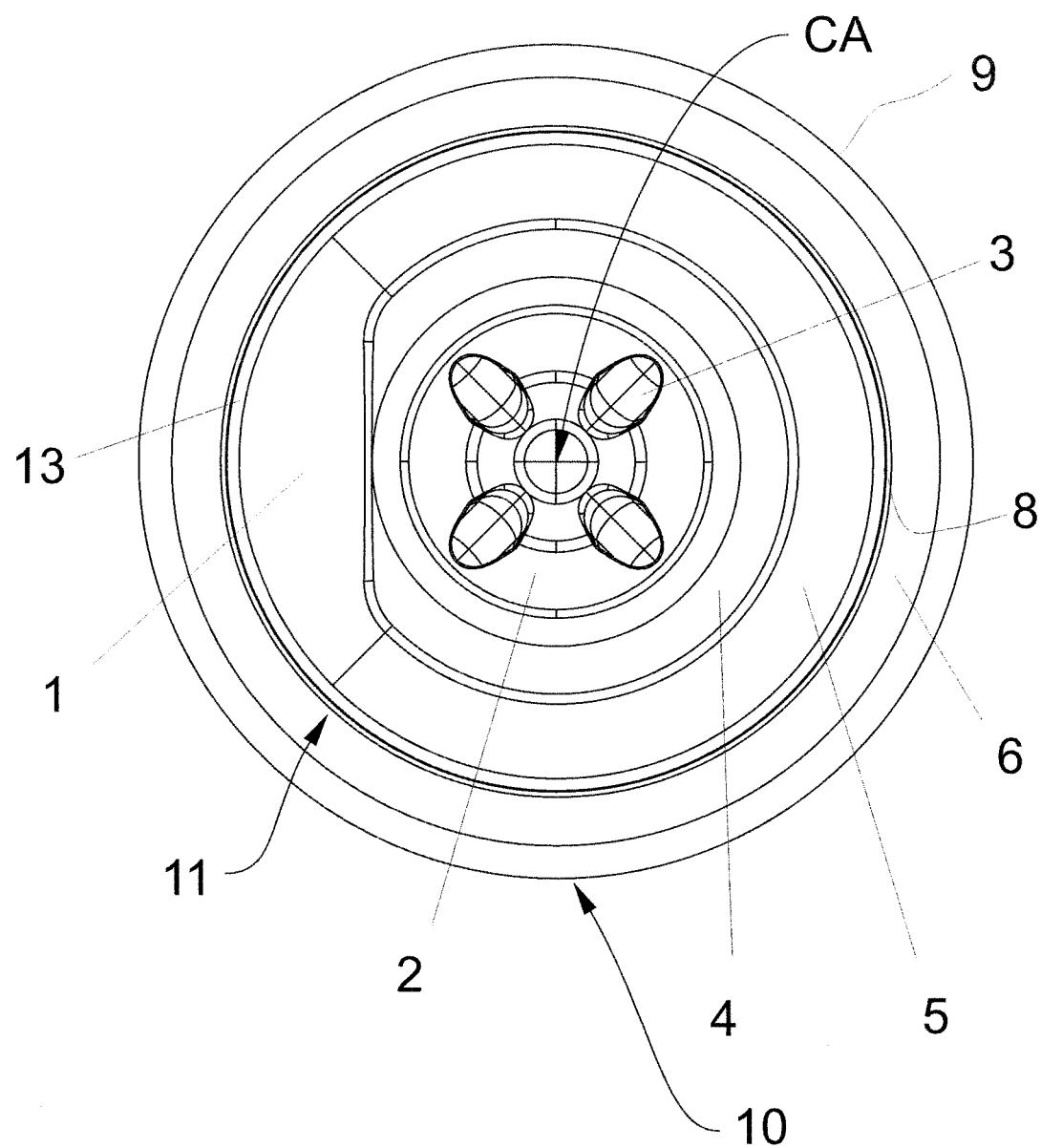
FIG. 5: shows an underneath view of the base of the container of FIG. 1 before collapsing.

Referring now particularly to FIG. 5, the base 2 with its strengthening ribs 3 is shown surrounded by the bottom annular portion 11 of the side wall 9 and the annular structure 13. The bottom portion 11 is shown in this particular embodiment as having an initiator portion 1 which forms part of the collapsing or inverting section which yields to a longitudinally-directed collapsing force before the rest of the collapsing or folding section. The base 2 is shown provided within the typical base standing or bearing ring 4, which will be the first support position for the container 10 prior to the inversion of the folding panel.

Associated with the initiator portion 1 is a control portion 5 which in this embodiment is a more steeply angled inverting section which will resist standing from the collapsed state.

Forming the outer perimeter of the bottom portion 11 of the side wall 9 is shown the side wall standing or bearing ring or annular portion 6 which following collapsing of the panel 11 will provide the new container support.

To allow for increased evacuation of vacuum it will be appreciated that it is preferable to provide a steep angle to the control portion 5 of the pressure panel 11. As shown in FIG. 6 the panel control portion 5 is generally set with an angle alpha with respect to a plane orthogonal to the container's longitudinal axis, or using the longitudinal axis as the reference, the angle alpha plus 90 degrees. The panel control portion 5 is generally set with an angle alpha varying between 30 degrees and 45 degrees, or in a range of about 120 degrees to about 135 degrees relative to the longitudinal axis. It is preferable to ensure an angle is set above 10 degrees at least, or above 100 degrees relative to the longitudinal axis. The initiator portion 1 may in this embodiment have a lesser angle beta of perhaps at least 10 degrees less than the control portion.

By way of example, it will be appreciated that when the panel 11 is inverted by mechanical compression it will undergo an angular change that is double that provided to it. If the conical control portion 5 is set to 10 degrees, or about 100 degrees relative to the longitudinal axis, it will provide a panel change equivalent to 20 degrees. At such a low angle it has been found to provide an inadequate amount of vacuum compensation in a hot-filled container. Therefore it is preferable to provide much steeper angles.

Figure 7:
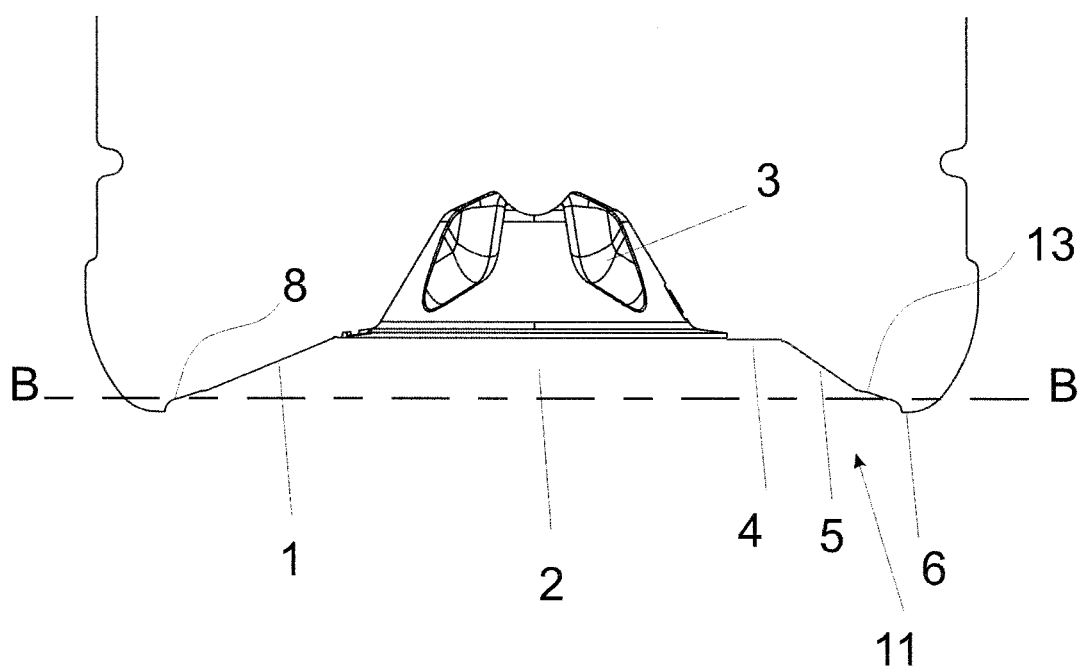
FIG. 7: shows the base of FIG. 2 following collapsing.

Referring to FIGS. 6 and 7, it will be appreciated that the control portion 5 may be initially set to be outwardly inclined by approximately 35 degrees and will then provide an inversion and angle change of approximately 70 degrees. The initiator portion may in this example be 20 degrees. As a further example referring to FIG. 6A, the base 2 may be recessed to such an extent that the entire lower sidewall portion and base are substantially or completely contained horizontally above the standing ring 6 even prior to folding of the pressure panel 11. Preferably the pressure panel 11 includes a portion inclined outwardly at an angle of greater than 10 degrees relative to a plane orthogonal to a longitudinal axis of the container when the pressure panel is in the initial position, or about 100 degrees relative to the longitudinal axis, and much steeper angles such as those described herein may be used.

Referring to FIGS. 8a and 8b, where the same reference numerals have been used where appropriate as previously, it is envisaged that in possible embodiments of this invention the initiator portion may be reconfigured so that pressure panel 11 would provide a conical area about the push up 28, in this embodiment being an inwardly recessed portion.

Figures 19A, 19B:
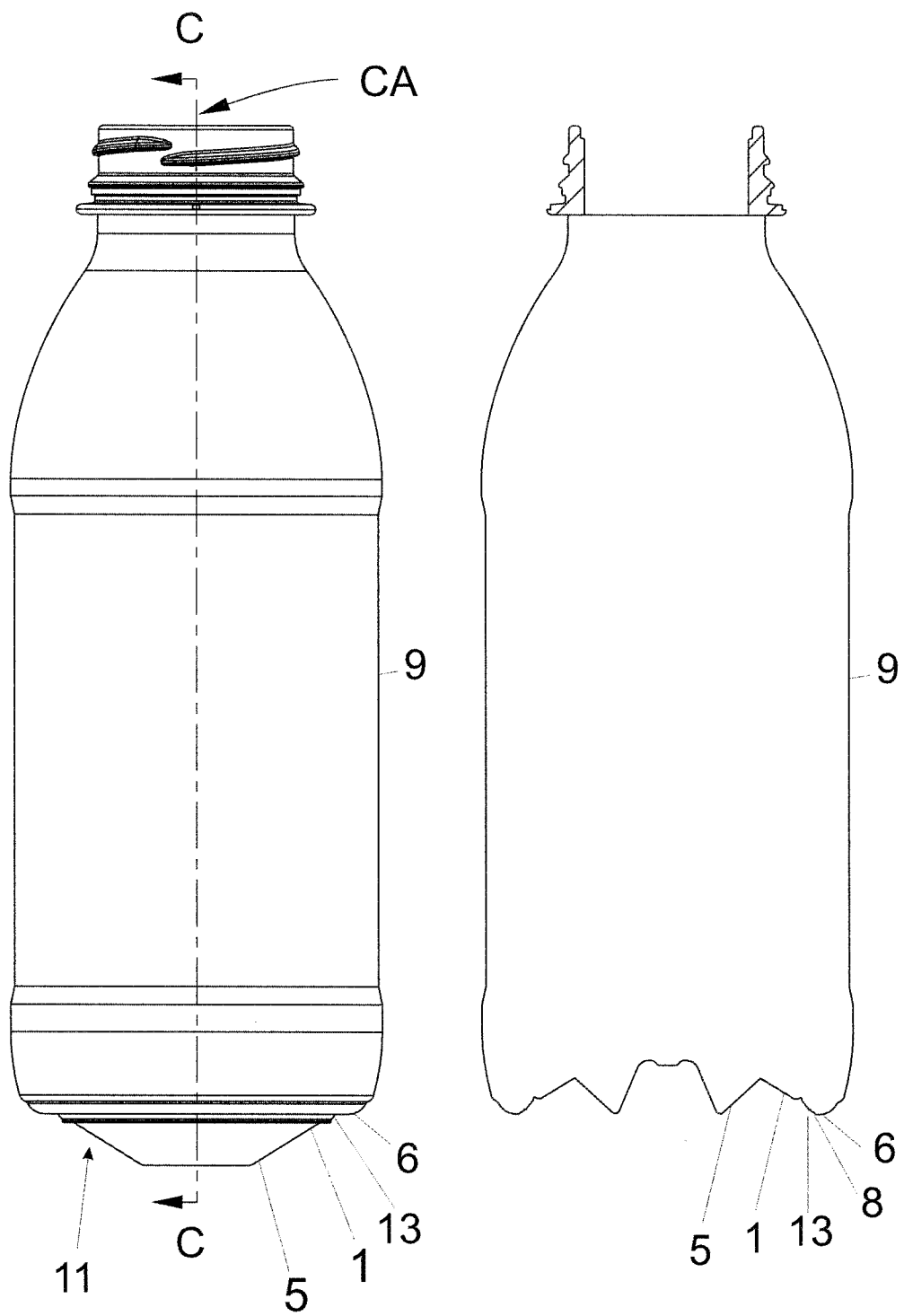
FIG. 19a: shows a side view of a hot-filled container of an alternative embodiment in its pre-collapsed condition.
FIG. 19b: shows a cross-sectional view of the container of FIG. 19a through the line C-C.
Figure 22:
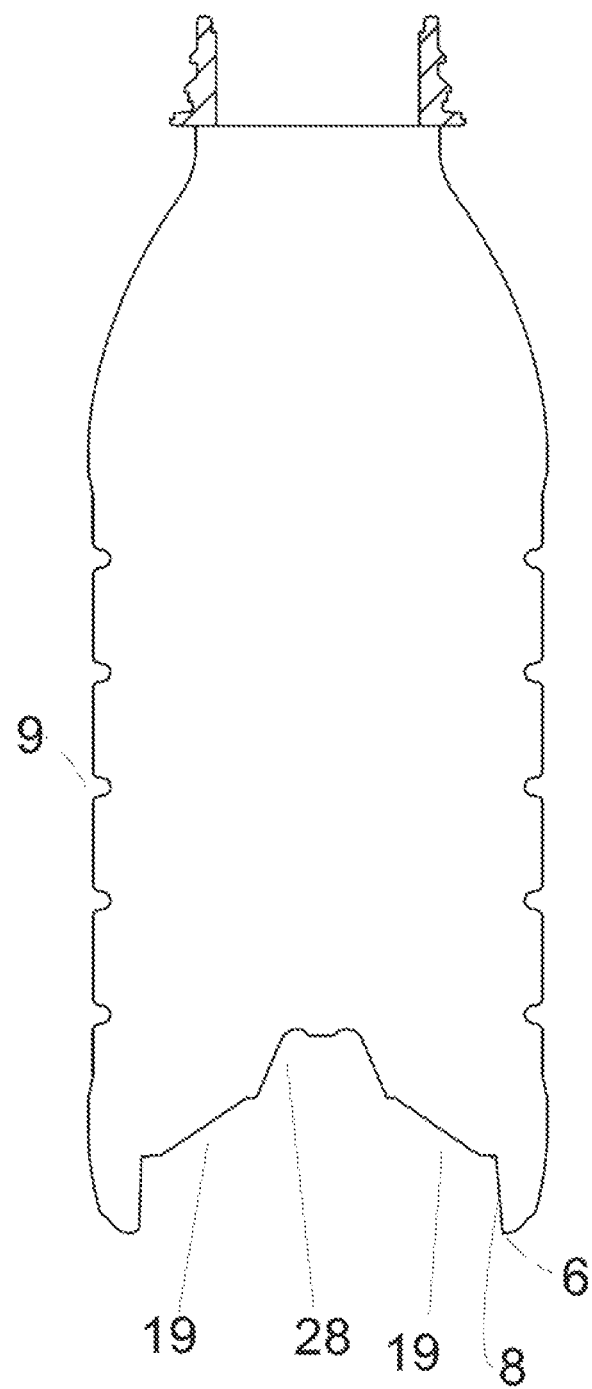
FIG. 22: shows a cross-sectional view of the container shown in FIG. 21 with the pressure panel repositioned substantially above the instep portion.

The initiator portion 1 and the control portion 5 of the embodiment of the preceding figures will now be at a common angle, such that they form a uniformly inclined panel portion. However, initiator portion 1 may still be configured to provide the area of least resistance to inversion, such that although it shares the same angular extent as the control portion 5, it still provides an initial area of collapse or inversion. In this embodiment, initiator portion 1 causes the pressure panel 11 to begin inversion from the widest diameter adjacent the decoupling structure 13. Such an arrangement is shown in FIGS. 19a and 19b.

Figure 17A:
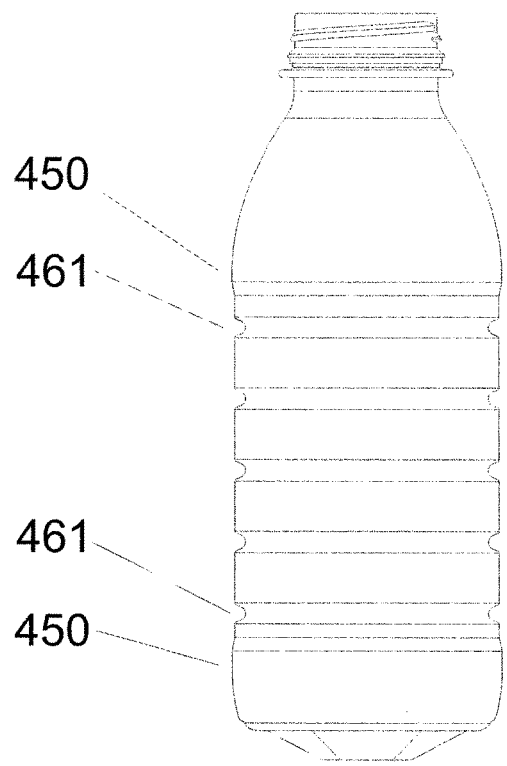
FIGS. 17a-d: show side, side perspective, end perspective and end views respectively of the container of FIG. 15.
Figure 17B:
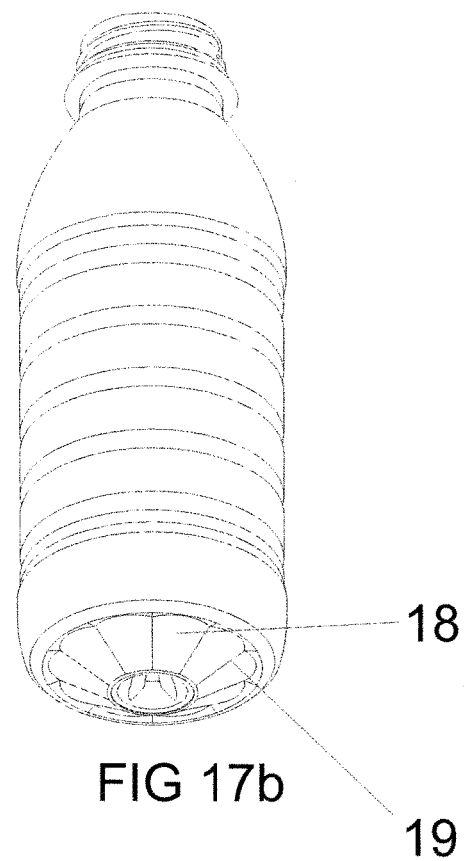
Figure 17C:
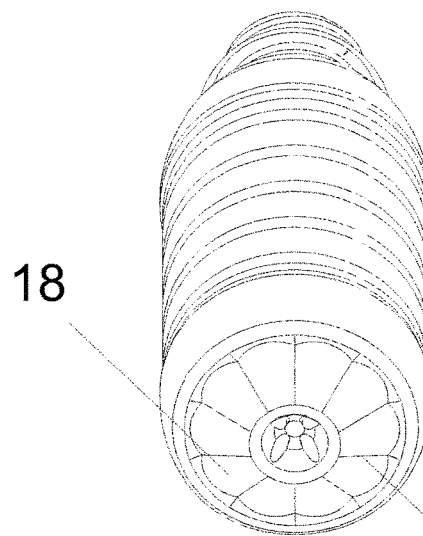
Figure 17D:
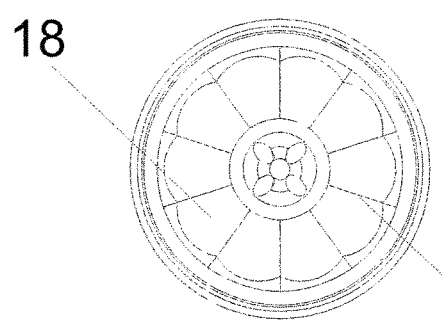
Figure 18A:
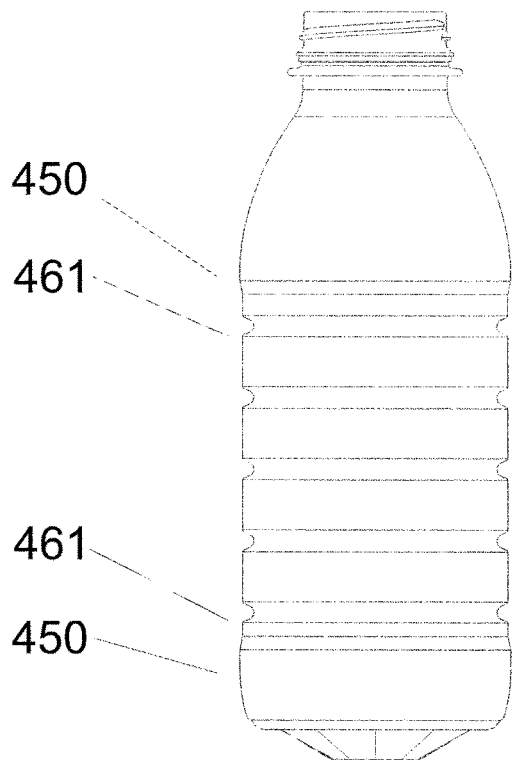
FIGS. 18a-d: show side, side perspective, end perspective and end views respectively of the container of FIG. 16.
Figure 18B:
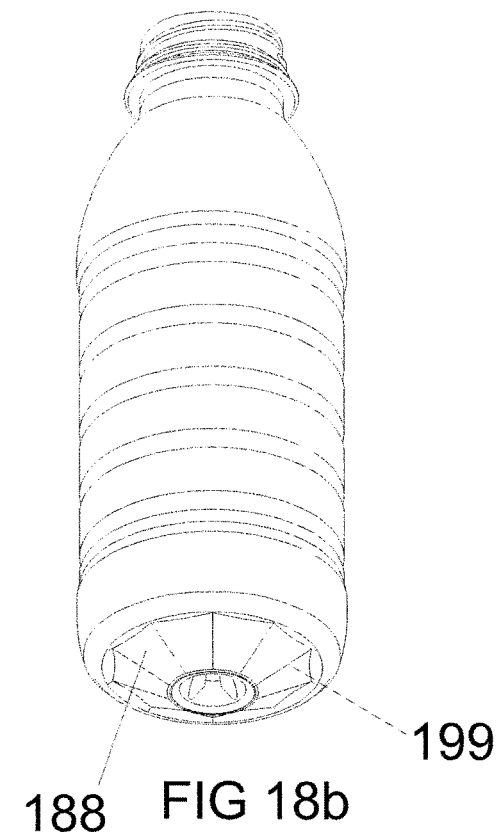
Figure 18C:
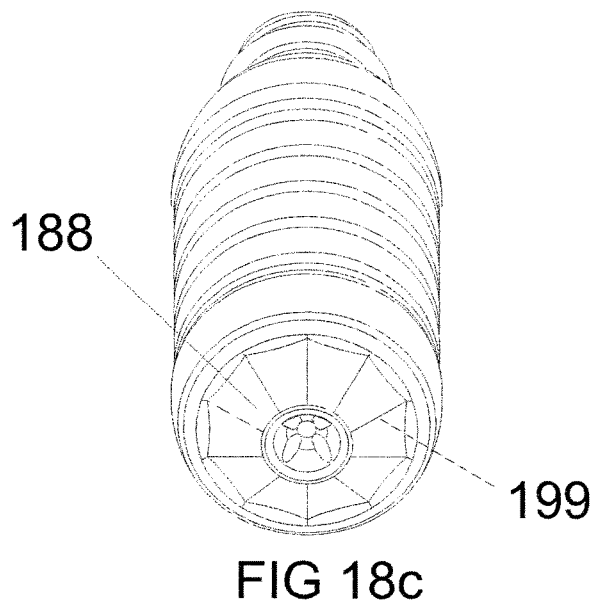
Figure 18D:
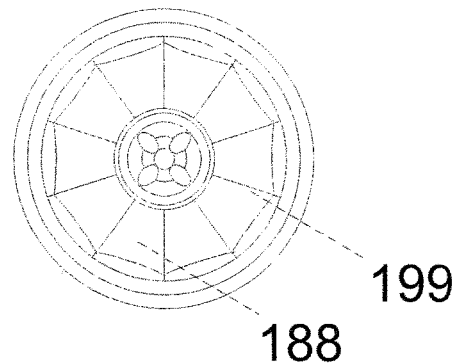

In the embodiment of FIGS. 8a and 8b the container side walls 9 are 'glass-like' in construction in that there are no additional strengthening ribs or panels as might be typically found in a container, particularly if required to withstand the forces of vacuum pressure. A container side wall can be less glass like, such as is shown in FIGS. 1 and 17a, and may include the structures shown therein, such as ribs or panels if desired, or other structures. Additionally, however, structures may be added to the conical portions of the vacuum panel 11 in order to add further control over the inversion process. For example, the conical portion of the vacuum panel 11 may be divided into fluted regions. Referring to FIGS. 8a and 9 especially, panel portions that are convex outwardly, and evenly distributed around the central axis create regions of greater angular set 19 delta and regions of lesser angular set 18 gamma, may provide for greater control over inversion of the panel. Such geometry provides increased resistance to reversion of the panel, and a more even distribution of forces when in the inverted position.

Referring to FIGS. 15a-c and 17a-d, convex or downwardly outwardly projecting flutes 18 are shown providing inwardly directed creases 19 therebetween. As discuss above, the creases may comprise a different angulation to the longitudinal axis than other portions of the pressure panel.

Concave or inwardly directed fluting arrangements are also envisioned, in addition to outwardly directed flutes. Inwardly directed flutes offer less resistance to initial inverting forces, coupled with increased resistance to reverting back out to the original position. In this way they behave in much the same manner as ribs to prevent the panel being forced back out to the outwardly inclined position, but allow for hinge movement from the first outwardly inclined position to the inwardly inclined position. Such inwardly or outwardly directed creases, flutes or projections function as ribs to increase or decrease the force required to invert the panel. It will be appreciated that the mechanical action applied to invert the panel will be sufficient to overcome any rib-strengthened panel, and when the mechanical action is removed the rib-strengthened panel, for example by strong flutes, will be very resistant to reversion to the original position if the container is dropped or shocked.

Figure 16A:
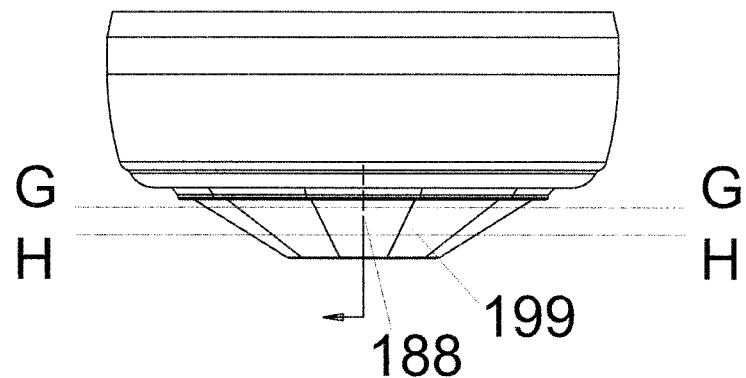
FIG. 16a: shows a side view of a container of FIG. 16c according to an alternative embodiment including inwardly projecting fluting through Line I-I.
Figure 16B:
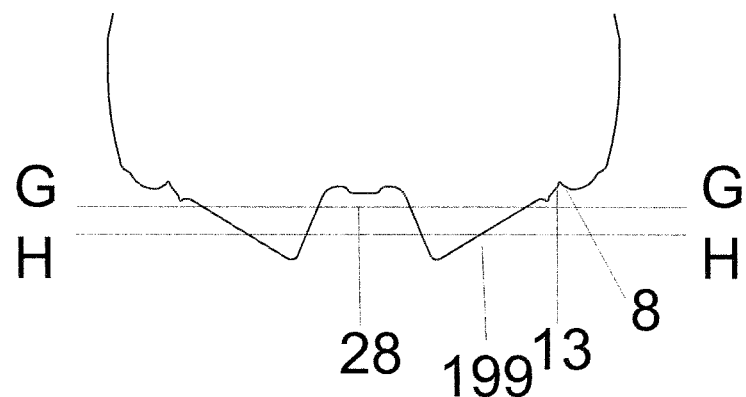
FIG. 16b: shows a cross-sectional view of the base of the container of FIG. 16c through Line J-J.
Figure 16C:
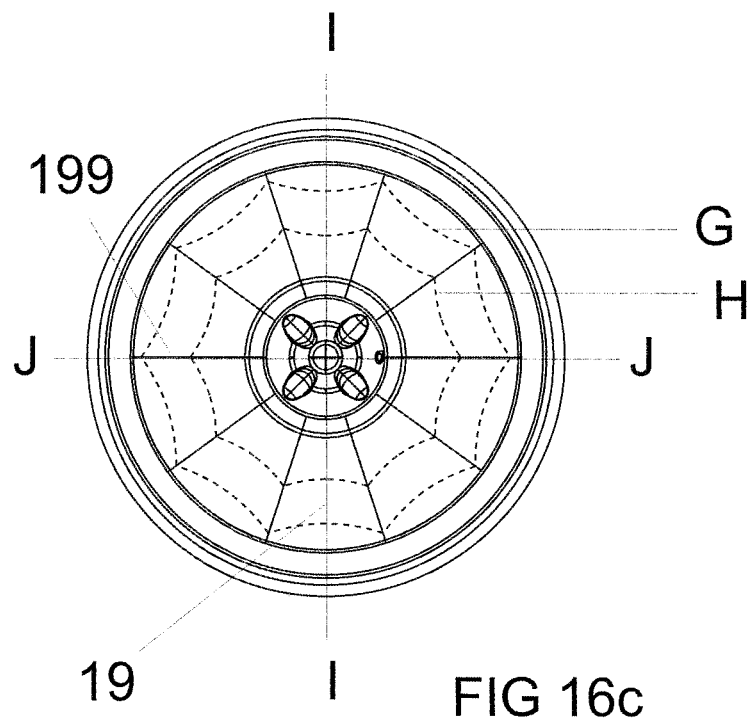
FIG. 16c: shows an underneath view of the base of the container of FIGS. 16a and 16b with dotted contour section lines through lines G-G and H-H.
Figure 16D:
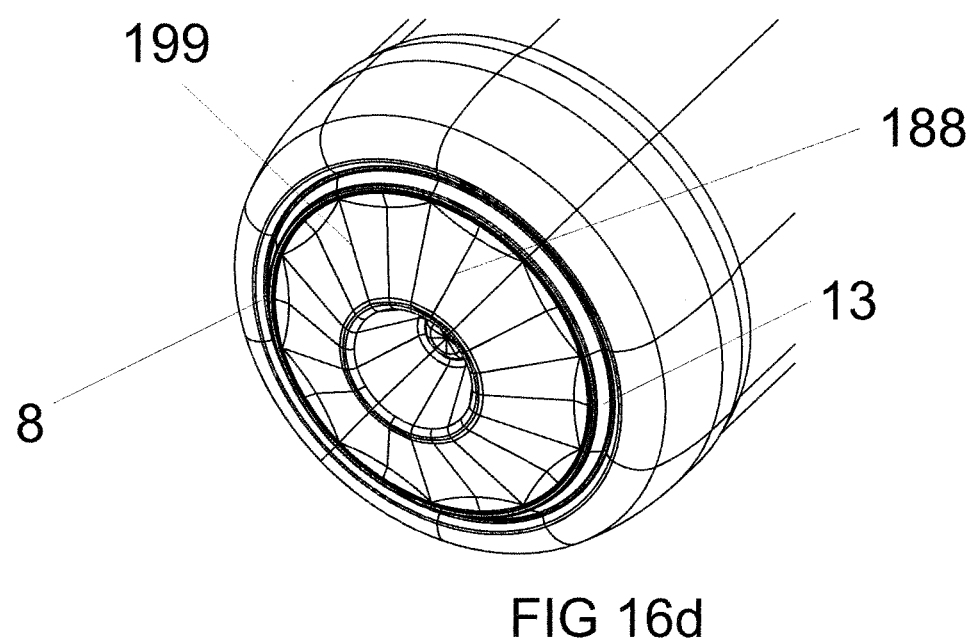
FIG. 16d: shows a perspective view of the base of the container of FIGS. 16a-c.

Referring to FIGS. 16a-d and 18a-d concave or upwardly inwardly projecting flutes are shown, the contour lines G and H of FIG. 16c illustrating this concavity through two cross-sectional reliefs. This embodiment provides downwardly or outwardly directed creases 199 between the inwardly directed flutes 188. The outwardly directed creases 199 in this example create regions of lesser angular set than the regions 188.

Further embodiments comprising arrays utilizing both concave and convex flutes are also intended within the scope of the invention.

Figures 11A, 11B, 11C, 11D:
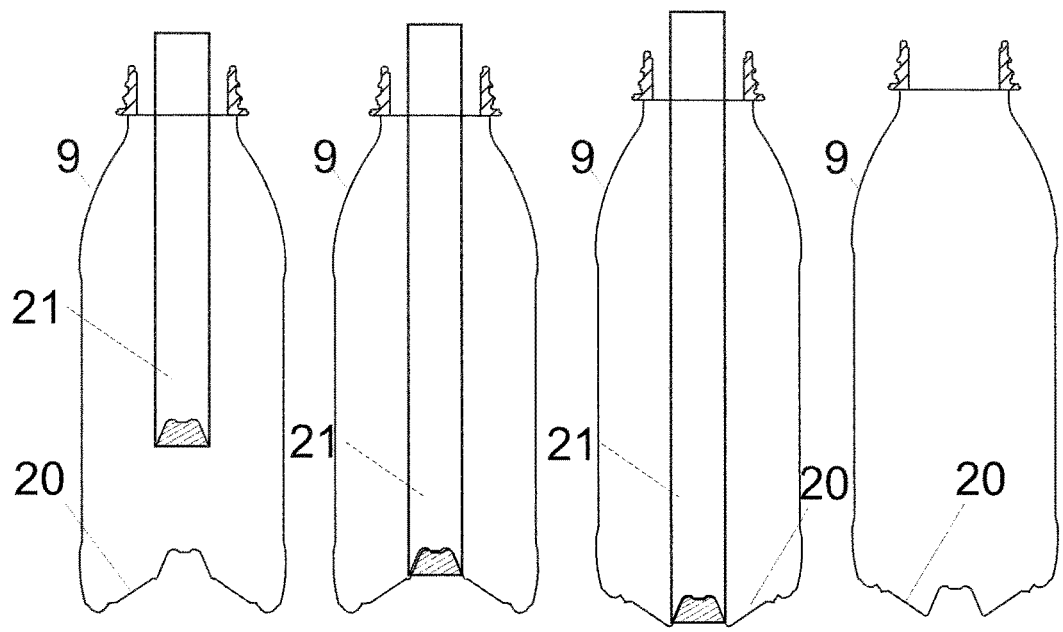
FIGS. 11a-d: show cross-sectional views of the container of FIGS. 8a-10a according to an alternative embodiment of the invention incorporating a pusher to provide panel folding.
Figures 12A, 12B, 12C, 12D:
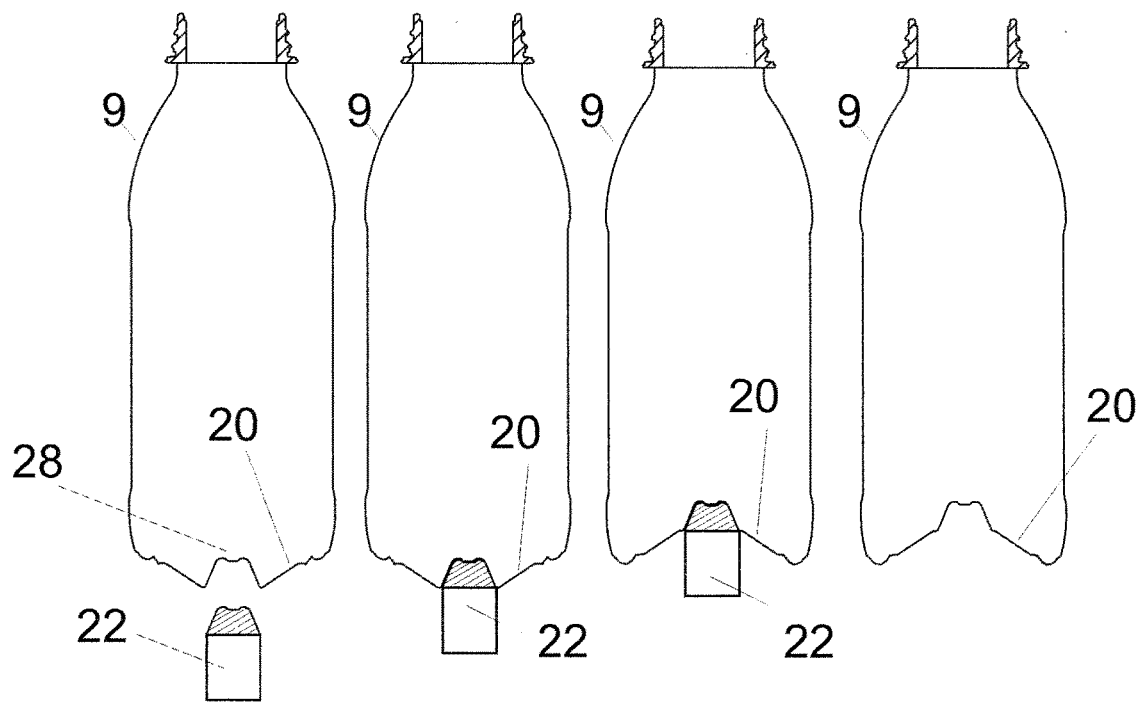
FIGS. 12a-d: show cross-sectional views of the container according to a further alternative embodiment of the invention incorporating a pusher to provide panel folding.

In the embodiment as shown in FIGS. 11a-d the container may be blow moulded with the pressure panel 20 in the inwardly or upwardly inclined position. A force could be imposed on the folding panel 20 such as by means of a mechanical pusher 21 introduced through the neck region and forced downwardly in order to place the panel in the outwardly inclined position prior to use as a vacuum container for example, as shown in FIG. 11d.

In such an embodiment as shown in FIGS. 12a-d, following the filling and capping of the bottle and the use of cold water spray creating the vacuum within the filled bottle, a force could be imposed on the folding panel 20 such as by means of engaging a mechanical pusher 22 or the creation of some relative movement of the centrally located push up portion 28 of the bottle base relative to a punch or the like, in order to force the panel 20 from an outwardly inclined position to an inwardly inclined position. Any deformation whereby the bottle shape was distorted prior to inversion of the panel 20 would be removed as internal volume is forcibly reduced. The vacuum within the container is removed as the inversion of the panel 20 causes a rise in pressure. Such a rise in pressure reduces vacuum pressure until ambient pressure is reached or even a slightly positive pressure is achieved.

It will be appreciate that in a further embodiment of the invention the panel may be inverted in the manner shown in FIGS. 12a-d in order to provide a panel to accommodate internal force such as is found in pasteurization and the like. In such a way the panel will provide relief against the internal pressure generated and then be capable of accommodating the resulting vacuum force generated when the product cools down.

In this way, the panel will be inverted from an upwardly inclined position FIGS. 11a to 11b to a downwardly inclined position as shown in FIGS. 12a-d, except that the mechanical action is not provided. The force is instead provided by the internal pressure of the contents.

Referring again to FIGS. 12a-d it will be seen that by the provision of the folding portion 20 in the bottom of the side wall 9 of the container 10 the major portion of the side wall 9 could be absent any structural features so that the container 10 could essentially replicate a glass container if this was required.

Although particular structures for the bottom portion of the side wall 9 are shown in the accompanying drawings it will be appreciated that alternative structures could be provided. For example a plurality of folding portions could be incorporated about the base 2 in an alternative embodiment.

There may also be provided many different decoupling or hinge structures or elements 13 without departing from the scope of the invention. With particular reference to FIGS. 6 and 7, it can be seen that the side of the decoupling structure 13 that is provided for the pressure panel 11 may be of an enlarged area to provide for increased longitudinal movement upwards into the container following inversion.

Figure 13:
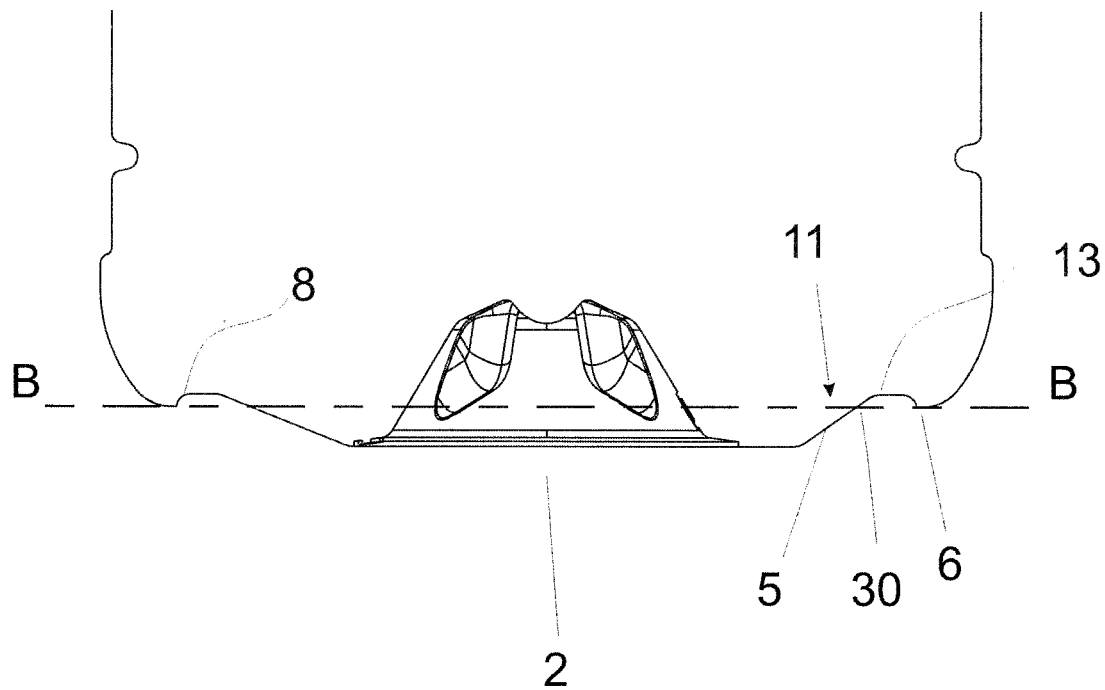
FIG. 13: shows the base of an alternative embodiment of the invention before collapsing.
Figure 14:
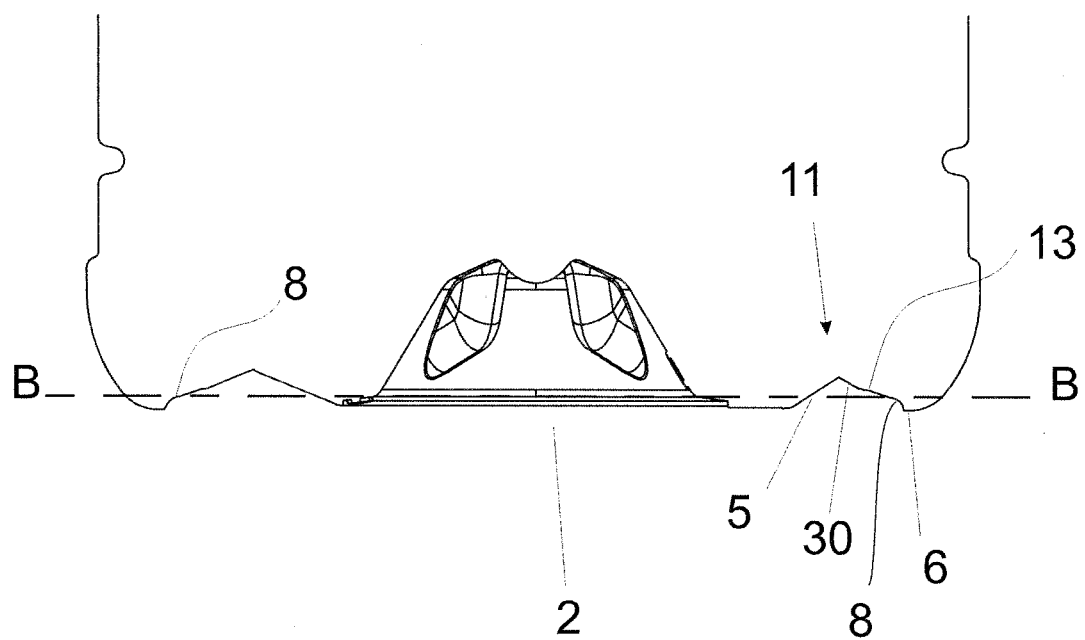
FIG. 14: shows the base of FIG. 13 during the initial stages of collapsing.
Figure 15A:
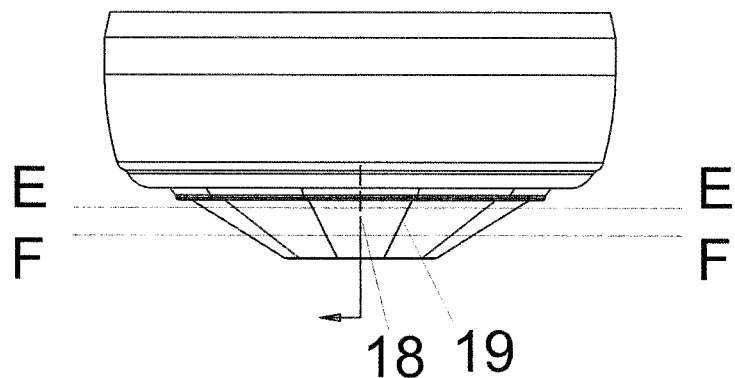
FIGS. 15a-b: show side and cross-sectional views of portions of the container shown in FIGS. 8-10a including outwardly projecting fluting.
Figure 15B:
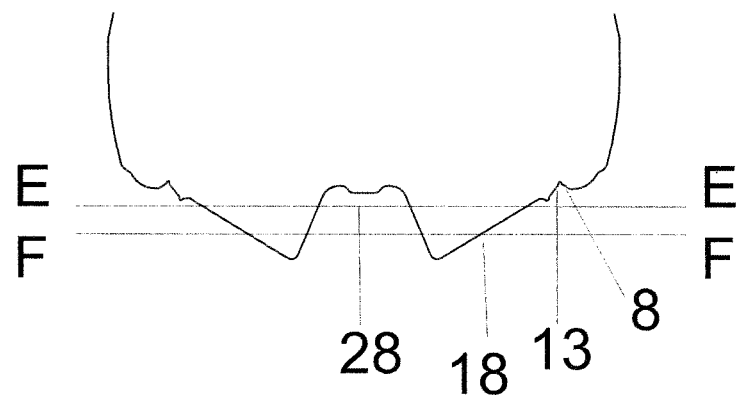
Figure 15C:
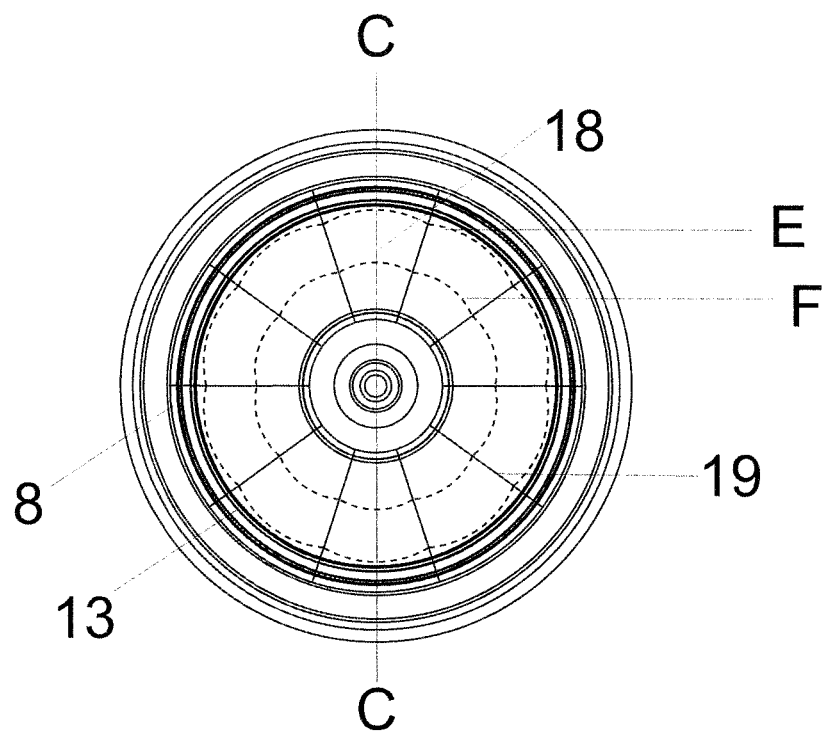
FIG. 15c: shows an underneath view of the base of the container of FIGS. 15a and 15b with dotted contour section lines through lines E-E and F-F.
Figure 15D:
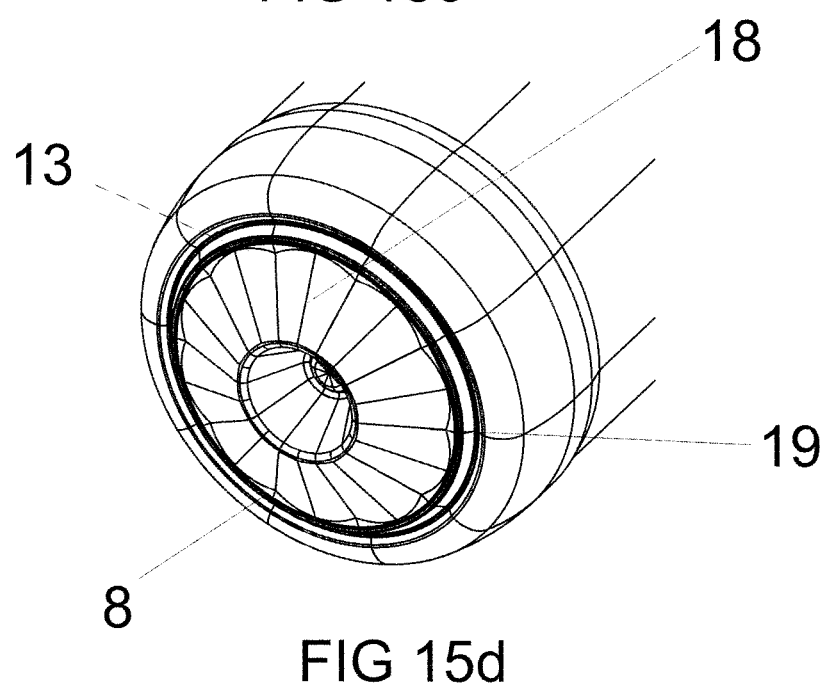
FIG. 15d: shows a perspective view of the base of the container portions of FIGS. 15a-c.
Figure 15E:
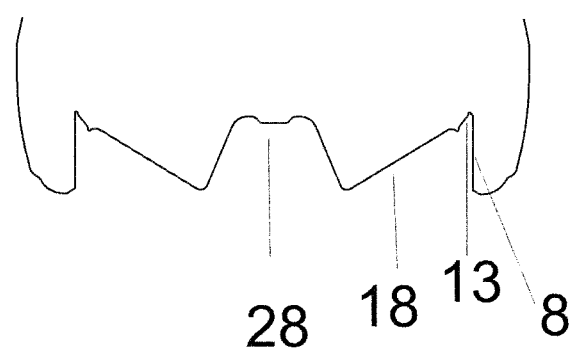
FIG. 15e: shows a cross-sectional view of a portion of the container shown in FIGS. 8-10a with the pressure panel in a pre-collapsed state recessed to such an extent that it is above the standing surface as is similarly shown in FIG. 10b.

In a further embodiment of the present invention, and referring to FIGS. 13 and 14, it can be seen that the widest portions 30 of the pressure panel 11 may invert earlier than the narrower portion of the control portion 5. The initiator portion may be constructed with this in mind, to allow for thinner material and so on, to provide for the panel 11 to begin inverting where it has the greater diameter, ahead of the narrower sections of the panel. In this case the portion 30 of the panel, which is radially set more distant from the central axis of the container inverts ahead of portion 5 to act as the initiator portion.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

What is claimed is:

1. A plastic bottle comprising: a neck portion; a body portion; and a base portion forming a standing surface for the plastic bottle, the base portion comprising: a bottom end having an instep portion extending away from the standing surface toward an interior of the bottle to a region of juncture with a pressure panel portion; the region of juncture providing a hinge element; the pressure panel portion extending away from the region of juncture, the pressure panel portion being inclined downwardly away from the neck portion prior to filling with a heated liquid and sealing with a cap, the pressure panel portion including a plurality of projections, ribs, flutes or creases; and a push-up portion circumscribed by the pressure panel portion, the pressure panel portion and the push-up portion being adapted to move about the hinge element provided on the region of juncture from a first position to a second position substantially above the instep portion to compensate for a vacuum pressure caused by a cooling of the heated liquid, the projections, ribs, flutes or creases being adapted to flex during movement of the pressure panel portion, wherein in the first position, the instep portion is recessed to such an extent that no portion of the pressure panel portion and the push-up portion extend below the standing surface.

2. The plastic bottle of claim 1, wherein the plurality of projections, ribs, flutes or creases are adapted to facilitate movement of the pressure panel portion.

3. The plastic bottle of claim 1, wherein the body portion includes at least one vacuum deforming portion.

4. The plastic bottle of claim 1, wherein the base portion includes an inwardly domed base region.

5. A plastic bottle comprising: a neck portion; a body portion; and a base portion forming a standing or bearing surface for the plastic bottle, the base portion comprising: a bottom end having a region of juncture between a first wall portion or instep and a second wall portion or pressure panel, wherein the region of juncture provides a hinge structure or element; the instep or first wall portion extending a first direction away from the hinge structure or element to the standing or bearing surface; the pressure panel or second wall portion extending a second direction away from the hinge structure or element, the second direction being downwardly away from the neck portion prior to filling with a heated liquid and sealing with a cap, the pressure panel or second wall portion including a plurality of projections, ribs, flutes or creases; and an inner section or push-up portion circumscribed by the second wall portion or pressure panel, the second wall portion or pressure panel and the inner section or push-up portion being adapted to move about the hinge structure or element from a first position to a second position above the first wall portion or instep, to compensate for a vacuum pressure caused by a cooling of the heated liquid, the projections, ribs, flutes or creases adapted to flex during movement of the second wall portion or pressure panel, wherein in the first position, the first wall portion or instep extends away from the standing surface toward an interior of the bottle and is recessed to such an extent that no portion of the second wall portion or pressure panel and the inner section or push-up portion extend below the standing surface.

6. The plastic bottle of claim 5, wherein the plurality of projections, ribs, flutes or creases are adapted to facilitate movement of the second wall portion or pressure panel.

7. The plastic bottle of claim 5, wherein the body portion includes at least one vacuum deforming portion or panel.

8. The plastic bottle of claim 5, wherein the base portion includes an inwardly domed base region.

9. A plastic bottle comprising: a neck portion; a body portion; and a base portion forming a bearing surface for the plastic bottle, the base portion comprising: a bottom end having a region of juncture between a first wall portion or instep and a second wall portion or pressure panel, wherein the region of juncture provides a hinge element; the first wall portion extending a first direction away from the hinge element; the second wall portion extending a second direction away from the hinge element, the second direction being downwardly away from the neck portion prior to filling with a heated liquid and sealing with a cap, the second wall portion including a plurality of radial creases or projections; and an inner section circumscribed by the second wall portion, the second wall portion and the inner section being adapted to move about the hinge element from a first position to a second position substantially above the first wall portion to compensate for a vacuum pressure caused by a cooling of the heated liquid, the creases or projections adapted to flex during movement of the second wall portion, wherein in the first position, the first wall portion or instep extends away from the standing surface toward an interior of the bottle and is recessed to such an extent that no portion of the second wall portion and the inner section extend below the bearing surface.

10. The plastic bottle of claim 9, wherein the plurality of radial creases or projections are adapted to facilitate movement of the second wall portion.

11. The plastic bottle of claim 9, wherein the body portion includes at least one vacuum panel.

12. The plastic bottle of claim 9, wherein the base portion includes an inwardly domed base region.

13. A plastic bottle comprising: a neck portion; a body portion, wherein the body portion includes at least one vacuum deforming portion; and a base portion forming a standing surface for the plastic bottle, the base portion comprising: a bottom end having a hinge structure; an instep portion extending from the hinge structure to the standing surface; a pressure panel portion extending away from the hinge structure, the pressure panel portion including a plurality of projections, ribs, flutes or creases; and a push-up portion circumscribed by the pressure panel portion, the pressure panel portion and the push-up portion being adapted to move about the hinge structure from a first position to a second position substantially above the instep portion, the projections, ribs, flutes or creases adapted to flex during movement of the pressure panel portion, wherein in the first position, the instep portion is recessed to such an extent that no portion of the pressure panel portion and the push-up portion extend below the standing surface.

14. A plastic bottle comprising: a neck portion; a body portion, wherein the body portion includes at least one vacuum deforming portion or panel; and a base portion forming a standing or bearing surface for the plastic bottle, the base portion comprising: a bottom end having a hinge structure or element; an instep or first wall portion extending a first direction away from the hinge structure or element to the standing or bearing surface; a pressure panel or second wall portion extending a second direction away from the hinge structure or element, the pressure panel or second wall portion including a plurality of projections, ribs, flutes or creases; and an inner section or push-up portion circumscribed by the second wall portion or pressure panel, the second wall portion or pressure panel and the inner section or push-up portion being adapted to move about the hinge structure or element from a first position to a second position above the first wall portion or instep, the projections, ribs, flutes or creases adapted to flex during movement of the second wall portion or pressure panel, wherein in the first position, the instep is recessed to such an extent that no portion of the second wall portion or pressure panel and the inner section or push-up portion extend below the standing surface.

15. A plastic bottle comprising: a neck portion; a body portion, wherein the body portion includes at least one vacuum panel; and a base portion forming a bearing surface for the plastic bottle, the base portion comprising: a bottom end having a hinge element; a first wall portion extending a first direction away from the hinge element; a second wall portion extending a second direction away from the hinge element, the second wall portion including a plurality of projections or creases; and an inner section circumscribed by the second wall portion, the second wall portion and the inner section being adapted to move about the hinge element from a first position to a second position substantially above the first wall portion, the projections or creases adapted to flex during movement of the second wall portion, wherein in the first position, no portion of the second wall portion and the inner section extend below the bearing surface.

* * * * *